(12) United States Patent
Duff et al.

(10) Patent No.: US 12,344,201 B2
(45) Date of Patent: Jul. 1, 2025

(54) WIPER DEVICES FOR SENSOR HOUSINGS

(71) Applicant: Waymo LLC, Mountain View, CA (US)

(72) Inventors: David Duff, Mountain View, CA (US); Michael Hall-Snyder, Mountain View, CA (US); Glenn Wheelock, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/957,252

(22) Filed: Sep. 30, 2022

(65) Prior Publication Data

US 2024/0109519 A1 Apr. 4, 2024

(51) Int. Cl.
*B60S 1/60* (2006.01)
*B60S 1/34* (2006.01)

(52) U.S. Cl.
CPC ............. *B60S 1/606* (2013.01); *B60S 1/3495* (2013.01)

(58) Field of Classification Search
CPC ..... H02P 7/06; B08B 1/00; B08B 1/04; B60S 1/04; B60S 1/08; B60S 1/48; B60S 1/56; B60S 1/3495; B60S 1/606; B60S 1/0411; G02B 27/0006
USPC ...................................... 15/250.351
See application file for complete search history.

(56) References Cited

U.S. PATENT DOCUMENTS

| | | | | |
|---|---|---|---|---|
| 5,426,815 A | * | 6/1995 | DaDeppo | B60S 1/3411 15/250.202 |
| 6,607,606 B2 | * | 8/2003 | Bronson | G02B 27/0006 134/44 |
| 8,567,963 B1 | | 10/2013 | Criscuolo et al. | |
| 9,568,807 B2 | * | 2/2017 | Aldred | G02B 27/0006 |

(Continued)

FOREIGN PATENT DOCUMENTS

| | | |
|---|---|---|
| CN | 110867657 A | 3/2020 |
| CN | 111257836 A | 6/2020 |

(Continued)

OTHER PUBLICATIONS

"New TF02-Pro-W LiDAR Level Sensor Silo Bins Volume Measurement with Cleaning Wiper 25m", Product Description, Oz Robotics, 2022.

(Continued)

*Primary Examiner* — Katina N. Henson
(74) *Attorney, Agent, or Firm* — MCDONNELL BOEHNEN HULBERT & BERGHOFF LLP

(57) ABSTRACT

Example embodiments relate to wiper devices for cleaning sensor housings. An example embodiment includes a wiper device for cleaning a surface of a rotatable sensor housing. The wiper device may have a driving arm having a first end and a second end. The first end of the driving arm is connected to a rotatable shaft. The wiper device may also have a wiper arm pivotally connected to the second end of the driving arm. The pivotal connection is located between a front region and a rear region of the wiper arm. Further, the wiper device may have a wiper blade coupled to the front region of the wiper arm. The wiper blade may be configured to wipe the surface of the rotatable sensor housing. Additionally, the wiper device may have a counterweight coupled to the rear region of the wiper arm.

20 Claims, 26 Drawing Sheets

(56) References Cited

U.S. PATENT DOCUMENTS

| | | |
|---|---|---|
| 10,391,981 B2 | 8/2019 | Schmidt |
| 10,442,402 B2 | 10/2019 | Schmidt et al. |
| 10,549,726 B2 | 2/2020 | Garcia Crespo et al. |
| 10,782,520 B2 | 9/2020 | Crespo et al. |
| 2007/0022558 A1 | 2/2007 | Petkov et al. |
| 2008/0052866 A1 | 3/2008 | Matsumoto et al. |
| 2016/0121855 A1* | 5/2016 | Doorley .................. B60S 1/56 15/250.01 |

FOREIGN PATENT DOCUMENTS

| | | | |
|---|---|---|---|
| CN | 212723324 U | 3/2021 | |
| CN | 113798232 A | 12/2021 | |
| CN | 114325651 A | 4/2022 | |
| CN | 114653642 A | 6/2022 | |
| DE | 10241894 A1 | 3/2004 | |
| DE | 102007061377 A1 | 4/2009 | |
| DE | 102019121910 A1 | 2/2021 | |
| GB | 958555 A | 5/1964 | |
| JP | H10129425 A * | 5/1998 | ............... B60S 1/32 |
| RU | 207386 U1 | 10/2021 | |

OTHER PUBLICATIONS

"Valeo Wiper Systems", Automotive News, 2021.
Ford, "Analysis of Ford automatic driving sensor cleaning system", Electronic Paper, Oct. 24, 2021.

* cited by examiner

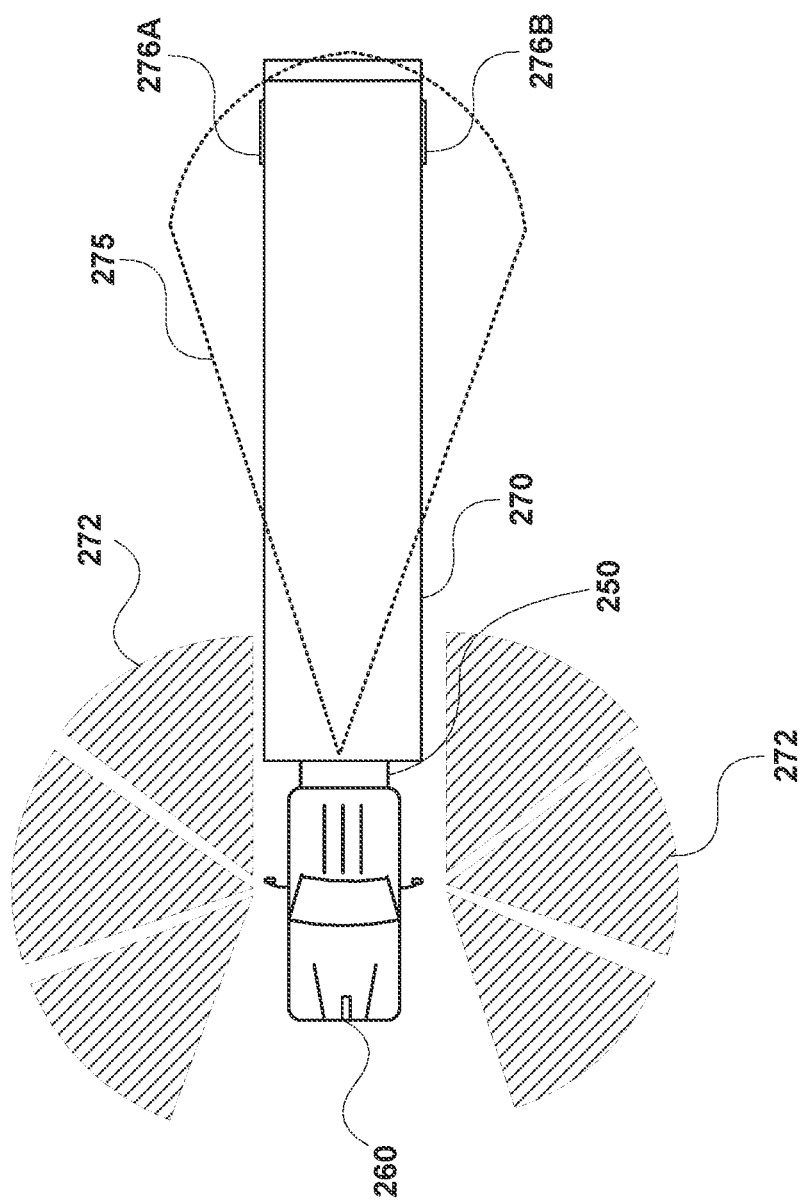

WIPER DEVICES FOR SENSOR HOUSINGS

BACKGROUND

Unless otherwise indicated herein, the description in this section is not prior art to the claims in this application and is not admitted to be prior art by inclusion in this section.

An autonomous vehicle or autonomously driven vehicle (ADV) may navigate a path of travel using information about the environment obtained by sensors of the vehicle. The autonomous vehicle or ADV may be equipped with various types of sensors in order to detect the environment surrounding the vehicle. For example, the autonomous vehicle may include light detection and ranging (lidar) sensors, radio detection and ranging (radar) sensors, sound navigation and ranging (sonar) sensors, image capture devices (e.g., cameras), microphone sensors, and other suitable sensors that scan and record data from the vehicle's surroundings. Sensor data from one or more of these sensors may be used to detect objects and their respective characteristics (position, shape, heading, speed, etc.). For example, a radar system or unit may detect objects and estimate the positions of the objects in the environment by transmitting radio signals (i.e., radar signals) and analyzing returning reflected signals from the objects and other surfaces in the environment.

The sensor systems employed by an autonomous vehicle or ADV to detect information (e.g., objects) in the environment may include a sensor housing or a radome (e.g., a radar dome or cover). The sensor housing may protect internal sensor components of the sensor system from environmental conditions and objects in the environment. The sensor housing may be constructed of one or more materials that permit the transmission and reception of sensor signals (e.g., radar and lidar) through the sensor housing. However, the sensor housing is often subjected to environmental elements (e.g., rain, hail, snow, road spray, dirt, and contaminants) and other objects that may accumulate on the outer surface of the sensor housing. When the outer surface of a sensor housing deteriorates or is damaged, material or matter (e.g., rain, snow, moisture, and road spray) may not be effectively repelled and/or dissipated from the sensor housing. Further, debris or moisture may accumulate on the sensor housing causing undesired effects on the transmission properties or characteristics of the sensor housing and/or the sensor signals that pass through the sensor housing, such as unwanted attenuation, reflection, refraction, absorption, beam deflection, beam broadening, etc. These undesired effects may decrease the detection and/or sensing capability of the sensor system and reduce the accuracy and reliability of the sensor measurements generated by the sensor system. As a result, the performance of the sensor system (e.g., radar systems and lidar systems) may be degraded or diminished as the sensor signals transmitted and received by the sensor system may suffer from attenuation and other undesired effects caused by the condition of the sensor housing.

SUMMARY

The present application discloses embodiments related to wiper devices or systems for wiping surfaces, such as sensor housings of sensor systems. For example, a sensor system may include internal sensor components (e.g., cameras, lidar devices, radar devices, and other sensor equipment) that transmit and receive signals through a sensor housing. The functions of the internal sensor components may be impacted as moisture and debris accumulate on the sensor housing. A wiper device or system may be mounted to the sensor housing of the sensor system to wipe an outer surface of the sensor housing. For example, the wiper device may wipe moisture and debris from the surface of the sensor housing.

The wiper device may be configured to clean or clear moisture and debris from a sensor housing of a rotatable sensor system. For example, the sensor housing of a rotatable sensor system may rotate or spin about an axis to provide a 360 degree field of view of the environment surrounding the sensor system. The wiper device may be configured to clean or clear moisture and debris from the sensor housing when the sensor housing is stationary or rotating. For example, when the sensor housing is rotating or spinning, the wiper device may apply sufficient pressure or force to the wiper blade so that the wiper blade engages and maintains proper contact with the sensor housing to wipe the surface of the sensor housing. The wiper device may be configured to continuously or periodically clear debris and moisture from the sensor housing. For example, the wiper system may be activated when moisture or debris is detected on the outer surface of the sensor housing and may be deactivated when the surface of the sensor housing is determined to be sufficiently cleared. In addition, cleaning and/or lubrication fluid may be applied to the outer surface of the sensor housing to assist with the cleaning process.

In one aspect, a wiper device for wiping a surface of a rotatable sensor housing is provided. The wiper device may have a driving arm having a first end and a second end. The first end of the driving arm may be connected to a rotatable shaft. The wiper device may also have a wiper arm pivotally connected to the second end of the driving arm. The pivotal connection may be located between a front region and a rear region of the wiper arm. Further, the wiper device may have a wiper blade coupled to the front region of the wiper arm. The wiper blade may be configured to wipe the surface of the rotatable sensor housing. Additionally, the wiper device may have a counterweight coupled to the rear region of the wiper arm.

In another aspect, a wiper device for wiping a surface of a rotatable sensor housing is provided. The wiper device may have a driving arm having a first end and a second end. The first end of the driving arm may be connected to a rotatable shaft. The wiper device may also have a wiper arm pivotally connected to the second end of the driving arm. The pivotal connection may be located between a front region and a rear region of the wiper arm. Further, the wiper device may have a counterweight coupled to the rear region of the wiper arm and a biasing member configured to apply a force to the rear region of the wiper arm. Additionally, the wiper device may include a wiper blade coupled to the front region of the wiper arm. The wiper blade may be configured to reciprocate between a first position and a second position to wipe the surface of the rotatable sensor housing.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 2K is an illustration of beam steering for a sensor, according to example embodiments.

DETAILED DESCRIPTION

Figure 1:
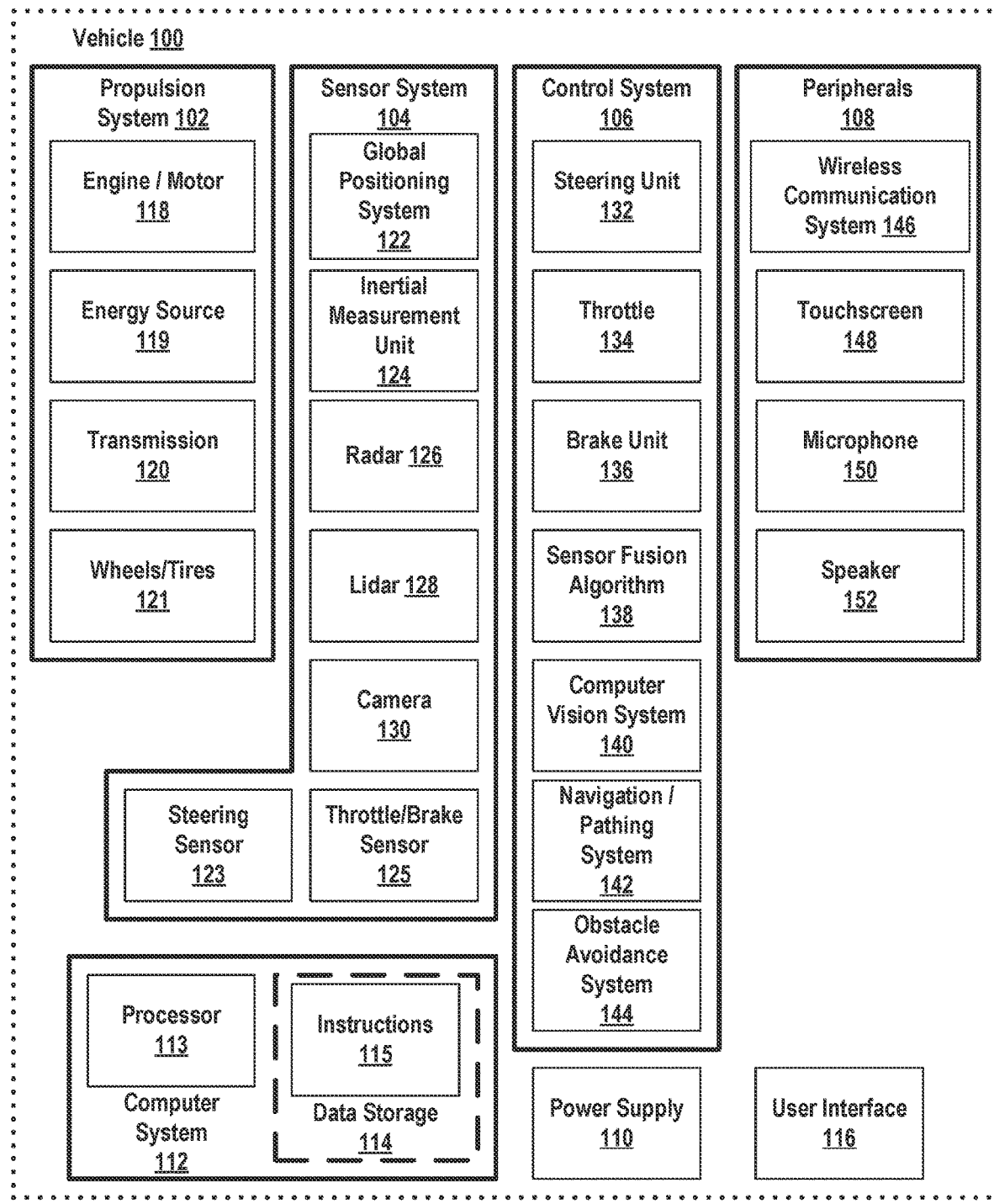
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Sensor systems or units may be used to detect and track objects in an environment. For example, a radar system may be used for detecting objects and estimating their positions in the environment by transmitting electromagnetic or radio signals (i.e., radar signals) and analyzing the backscattered or reflected return signals from the objects and other surfaces in an environment. The radar system may process the reflected return signals to generate two dimensional (2D) and/or three dimensional (3D) measurements that represent aspects of the environment, such as the positions, orientations, and movements (including non-movements) of nearby objects and other surfaces located in the surrounding environment. Similarly, lidar devices can include one or more light emitters and one or more detectors to detect light that is emitted by the one or more light emitters and reflected by one or more objects in the environment surrounding the lidar devices.

Because sensor systems may be used to measure distances and motions of nearby objects and other surfaces, sensor systems are being increasingly incorporated into vehicles for obtaining and providing useful information for vehicle navigation, obstacle avoidance, and other vehicle operations that may boost overall vehicle safety. For instance, the sensor systems may be used to detect and potentially identify the positions, orientations, and movements (including non-movements) of nearby vehicles, bicycles, pedestrians, animals, and objects surrounding a vehicle. The sensor systems may also provide information about other features in the vehicle's surrounding environment, such as the location, arrangement, and position of road boundaries, road conditions (e.g., smooth or bumpy surfaces), weather conditions (e.g., wet or snowy roadways), and the relative positions of traffic signs and signals. As such, the sensor systems may enable vehicle systems to continuously monitor and understand changes during navigation in various environments.

Further, the sensor systems may provide information aimed to assist the vehicle's driver. For instance, sensor measurements may be used to generate alerts when the vehicle drifts outside its lane, when the vehicle travels too closely to another vehicle or object, and/or in other ways that can help the driver safely control the vehicle. The sensor measurements may also be used to help enable autonomous or semi-autonomous operations by the vehicle. In particular, sensor data may be used by control or computer systems to navigate the vehicle's environment.

A vehicle sensor system can include one or more sensor systems or units positioned at various locations on a vehicle. For instance, one or more sensor systems may be coupled to the vehicle at various positions, such as side mirrors, bumpers, the roof, the front grill, doors, the trunk, or side panels on the vehicle. Using exterior locations to attach and position sensor systems may enable swift installation of the sensor systems on a standard vehicle without requiring redesigning and specially manufacturing the vehicle. In addition, the orientation and position of the sensor systems may be easily adjusted when the sensor systems are coupled at exterior vehicle locations. This arrangement may speed up the installation and calibration processes. By using exterior positions on the vehicle, the sensor systems may be able to capture measurements from optimal positions and orientations on the vehicle.

When a sensor system is located on the exterior of the vehicle, the sensor system may undesirably encounter contact from road debris, which can degrade the performance of the sensor system. For instance, as the vehicle navigates a path, debris (e.g., rocks and loose pieces of road) may be kicked up and propelled towards the sensor system by the vehicle and other nearby vehicles. This debris can reduce or degrade the performance of the sensor system and impact subsequent operation of the vehicle sensor system overall. In addition, puddles and snow that accumulate on the road can be propelled towards the vehicle by nearby vehicles and similarly degrade the performance of the sensor system.

Further, weather conditions can also create conditions that undesirably impact the sensor systems that are coupled at exterior positions on the vehicle. Rain, hail, sleet, snow, and other weather conditions may undesirably come into contact with the sensor system and reduce the performance of the sensor system. Thus, exposure to weather elements may cause the sensor systems to degrade and perform less optimally. Furthermore, any sensor system coupled at an exterior location on a vehicle is also exposed to undesirable contact from pedestrians, such as while the vehicle is parked and not in use.

To overcome these potential issues as well as others that may arise when placing sensor systems on the exterior of a vehicle, the sensor system may include a sensor housing or radome (e.g., cover) composed of a frequency transparent material. The sensor housing may be designed to protect and conceal one or more internal components of the sensor system from the environment. For example, the sensor housing may enclose cameras and antennas of the sensor system and provide protection from undesirable environmental factors, such as debris and weather conditions. The sensor housing may be constructed from materials that allow sensor signals (e.g., transmitted and received sensor signals) to pass therethrough with minimum attenuation (e.g., minimum distortion, reflection, and absorption). For example, the sensor housing may be formed from one or more plastic materials. In some embodiments, the housing may have a lens or window to allow sensor signals (e.g., transmitted and received sensor signals) to pass therethrough.

However, in some implementations, the outer surface or window of the sensor housing may be susceptible to the accumulation of matter or material (e.g., rain, snow, dirt, and water). For example, under certain conditions, rain, snow, road spray and/or moisture may accumulate or build up on the outer surface or window of the sensor housing, and thereby adversely impact the performance of the sensor system. To mitigate or help prevent matter or material from building up on the sensor housing, the outer surface or window of the housing may be coated with a hydrophobic or super-hydrophobic coating or film. For example, hydrophobic coatings or surfaces may be used to mitigate or reduce the amount of material or matter (e.g., rain, snow, dirt, and water) that may accumulate on the sensor housing. In some implementations, the outer surface of the sensor housing may be curved to further facilitate water and/or snow run-off.

When the outer surface or coating/film of the housing deteriorates or is damaged, the transmission properties or characteristics of the housing (e.g., the outer coating or film) may be degraded and the performance and/or sensitivity of the radar system may be reduced or diminished. For example, a damaged or deteriorated coating/film of the outer surface of the sensor housing may not effectively disburse and/or repel material or matter (e.g., rain, snow, moisture, water, and spray) from the sensor housing. Further, water droplets or moisture may accumulate, build up, and/or remain on the outer surface of the sensor housing, especially sensor housings without water repellent coatings.

The presence of the water droplets or moisture on the sensor housing may cause undesired effects on the sensor signals that pass through the sensor housing (e.g., unwanted attenuation, reflection, refraction, absorption, beam deflection, and beam broadening). For example, the functions of the internal sensor components may be impeded as signals transmitted and received by the internal sensor components may be blocked or reduced by debris or moisture on the sensor housing. These undesired effects may decrease the detection and/or sensing capability of the sensor system as well as reduce the accuracy of the sensor system's measurements. As a result, the performance of the sensor system may be degraded or diminished as signals transmitted and received by the sensor system may suffer from attenuation and other undesired effects caused by the conditions (e.g., debris and moisture) of the sensor housing. Therefore, it might not be safe to allow a vehicle operating autonomously to navigate using a sensor system having an impaired and/or obstructed sensor housing.

The present application discloses embodiments related to wiper devices or systems for wiping surfaces, such as sensor housings of sensor systems. For example, a sensor system may include internal sensor components (e.g., cameras, lidar devices, radar devices, and other sensor equipment) that transmit and receive signals through a sensor housing. The functions of the internal sensor components may be impacted as moisture and debris accumulate on the sensor housing. A wiper device may be mounted to the sensor housing of the sensor system to wipe an outer surface of the sensor housing. The wiper device may be configured to wipe the moisture and debris from the surface of the sensor housing. In some embodiments, the sensor housing may include a window and the internal sensor components may transmit and receive one or more signals through the window. The wiper device may be configured to clear or clean debris and moisture from the window of the sensor housing.

Further, the wiper device may be configured to wipe a sensor housing of a rotatable sensor system. For example, the sensor housing of a rotatable sensor system may rotate or spin about an axis to provide a 360 degree field of view of the environment surrounding the sensor system. The wiper device may wipe the sensor housing when the sensor housing is stationary or rotating. For example, when the sensor housing is rotating or spinning, the wiper device may apply sufficient pressure or force to a wiper blade so that the wiper blade engages and maintains proper contact with the sensor housing to wipe the surface of the sensor housing. The wiper device may be configured to continuously or periodically clear debris and moisture from the sensor housing. For example, the wiper device may be activated when moisture or debris is detected on the outer surface of the sensor housing and may be deactivated when the surface of the sensor housing is determined to be sufficiently cleared. In addition, cleaning and/or lubrication fluid may be applied to the outer surface of the sensor housing to assist with the cleaning process.

The wiper device may include a wiper blade coupled to a front region of a wiper arm. The wiper device may be activated to reciprocate or move the wiper blade back and forth over the surface of the sensor housing. The wiper arm may be pivotally connected to an end of a driving arm or connecting member of the wiper device. The driving arm may be coupled to a rotatable shaft of a driving assembly. The driving assembly may rotate the driving arm in clockwise and counterclockwise directions to reciprocate the wiper blade between a first position and a second position.

The wiper arm may include a weight or counterbalance (e.g., counterweight) at a rear region of the wiper arm. For example, the wiper arm may be configured with a weight or counterbalance on one side of the pivotal connection and a wiper blade on the opposite side. The wiper arm may be balanced about the pivotal connection so that the wiper arm has a center of gravity at the pivotal connection. For example, the load of the front region of the wipe blade may be approximately equal to the load on the rear region of the wide blade. The front region and the rear region of the wiper arm may be on opposite sides of the pivotal connection. As such, when the sensor housing is stationary and the center of gravity of the wiper arm is at the pivotal connection, no force may be applied to the wiper blade by the wipe arm and the wiper device may be positioned adjacent to the sensor housing in a stowed position. In the stow position, the wiper blade may be spaced apart from and not in contact with the sensor housing. However, when the sensor housing rotates or spins, the wiper blade of the wiper device may be deployed or moved to engage a surface of the sensor housing. The wiping arm may be configured to cause, upon rotation, the wiper blade to be pressed against the surface of the sensor housing. For example, as the sensor housing spins, a force may be provided by the weighted end of the wiper arm causing the wiper blade to engage and be pressed against the sensor housing.

In one embodiment, a biasing member (e.g., a spring) may be positioned between the driving arm and the wiper arm to provide a pressure or force on the rear region of the wiper arm to cause a force to be applied to the front region of the wiper arm in the direction of the surface of the sensor housing to be wiped. As a result, the wiper blade will be pressed against the surface of the housing sensor. In this arrangement, the wiper arm may be balanced about the pivotal connection so that the wiper blade has a center of gravity at the pivot connection and the force provided by the biasing member may cause the wiper blade to press against the surface of the sensor housing. Further, when the sensor housing spins, the wiper arm applies additional force to the wiper blade due to the counterweight on the rear region of the wiper arm so that the wiper blade further engages and maintains contact with the surface of the sensor housing. In other embodiments, the wiper system may not include a biasing member and the weight of the counterbalance may be increased. For example, the wiper arm of the wiper device may have a center of gravity that is offset by a predetermined distance from the pivotal connection of the wiper arm based on the counterweight on the rear end of the wiper arm. In this arrangement, the wiper arm may apply a force to the wiper blade so that the wiper blade contacts the surface of the sensor housing.

Further, the wiper device may also include a fluid dispensing system. The fluid dispensing system may operate in tandem with the wiper device to assist in clearing moisture and debris from the surface of the sensor housing. For example, a cleaning and/or lubricating fluid can be automatically dispensed or sprayed by the fluid dispensing system onto the outer surface of the sensor housing to assist with the cleaning or removal process. In one example, as the sensor housing is rotating, the fluid dispensing system may emit fluid each time the wiper blade passes the spray nozzle. In this regard, a control system that communicates with the wiper device may detect the position or location of the wiper device on the sensor housing, detect the speed of the sensor housing or wiper system, and cause fluid to be dispensed at particular times or intervals. The control system may include one or more processors that process information in order to control aspects of the wiper device as further discussed below.

The features of the wiper device described herein enable the wiper blade to be pressed against a surface of a rotating sensor housing to clear moisture and debris. The wiper arm of the wiper device may react to and/or counteract to the forces on the wiper arm as the sensor housing rotates. As such, the wiper arm may maintain and provide sufficient pressure to cause the wiper blade to engage or be pressed against the surface of the sensor housing. By doing such, the sensor system may continue operation without interruption or the need for an individual to manually clean the sensor housing since the wiper blade of the wiper device may continually and rapidly wipe the sensor housing when needed. As such, the wiper device may enable the rotatable sensor system to continually operate in various environments including environments that produce a lot of debris, such as construction sites or off-road locations for road vehicles such as cars, trucks, etc. However, while certain aspects of the disclosure may be particularly useful in connection with specific types of vehicles, the vehicle may be any type of vehicle.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, and one or more machine-learned models) operable to process and analyze images in an effort to determine objects that are in motion (e.g., other vehicles, pedestrians, bicyclists, and animals) and objects that are not in motion (e.g., traffic lights, roadway boundaries, speed-bumps, and potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones, and sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars, one or more lidars and cameras; one or more cameras and radars; and one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, and to adapt to specialized environmental or application circumstances). For example, the sensor systems (e.g., 202 and 204) could be disposed of in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208 and 210), to actively scan the environment near the back of the vehicle 200 for the presence of radio-reflective objects. Similarly, one or more radars can be located near the front of the vehicle 200 (e.g., sensor systems 212 and 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, and microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, and alarms) upon which control strategy for vehicle 200 may be based. For example, if the acoustic sensor detects a siren (e.g., an ambulatory siren, and a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
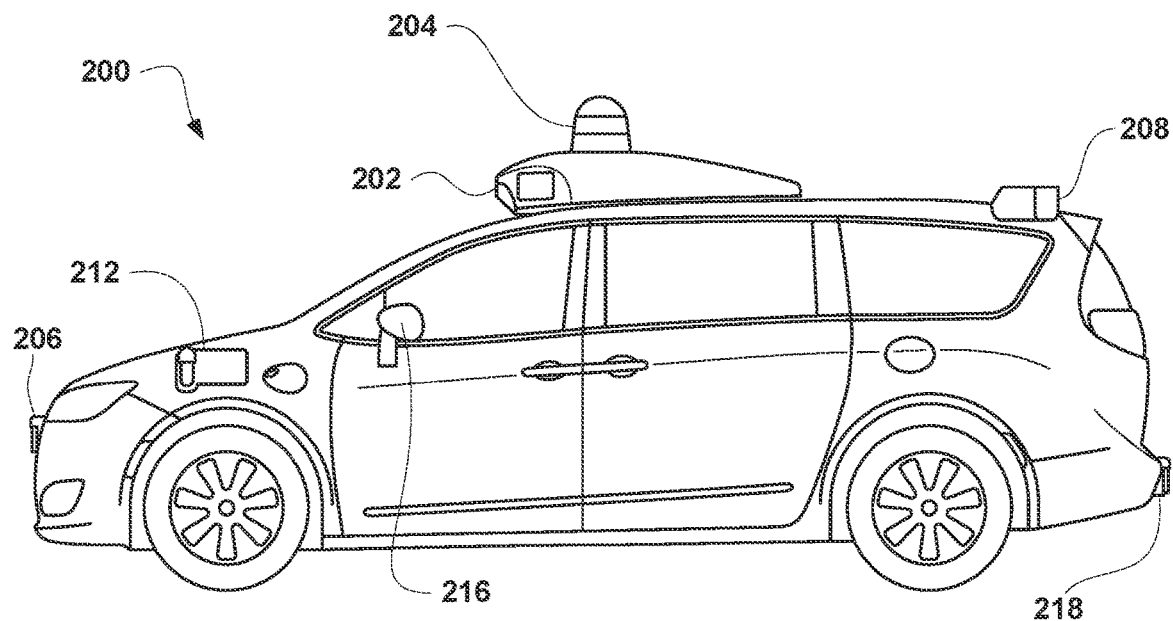
FIG. 2A is an illustration of a physical configuration of a vehicle, according to example embodiments.
Figure 2B:
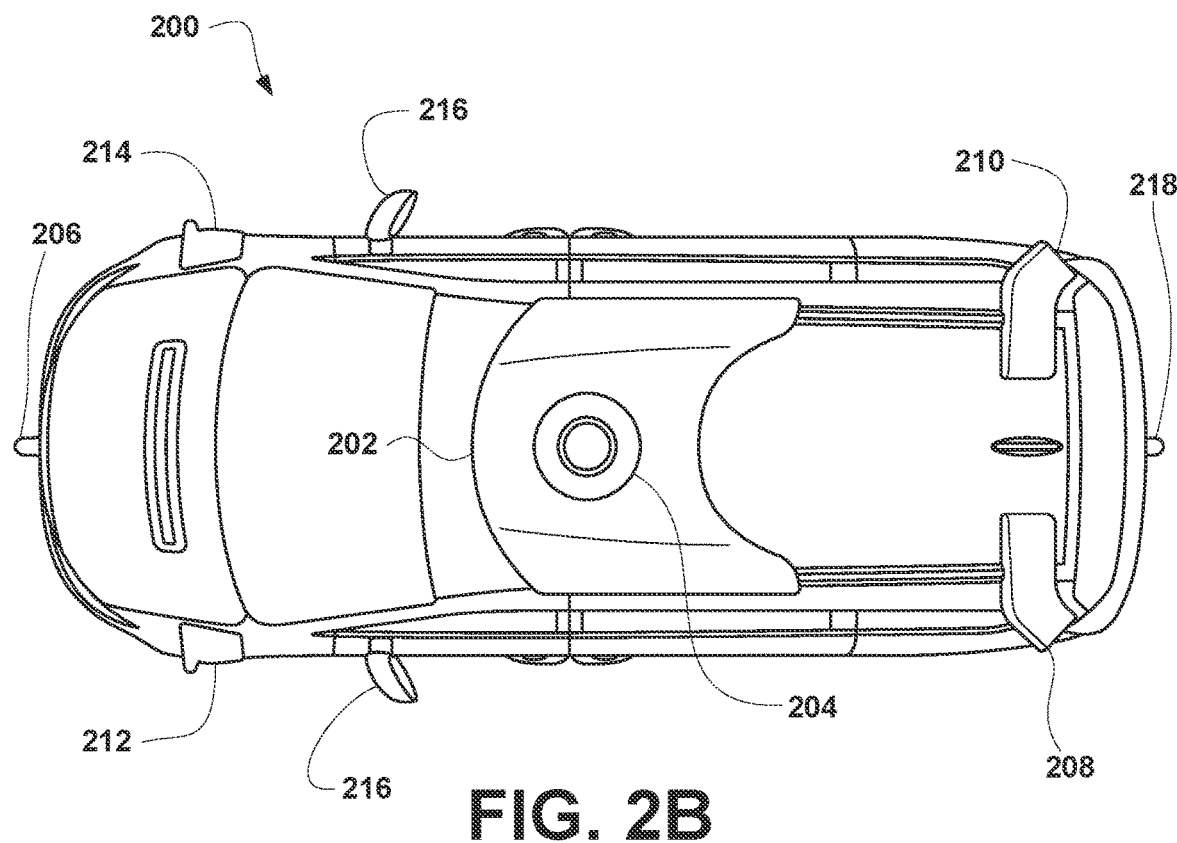
FIG. 2B is an illustration of a physical configuration of a vehicle, according to example embodiments.
Figure 2C:
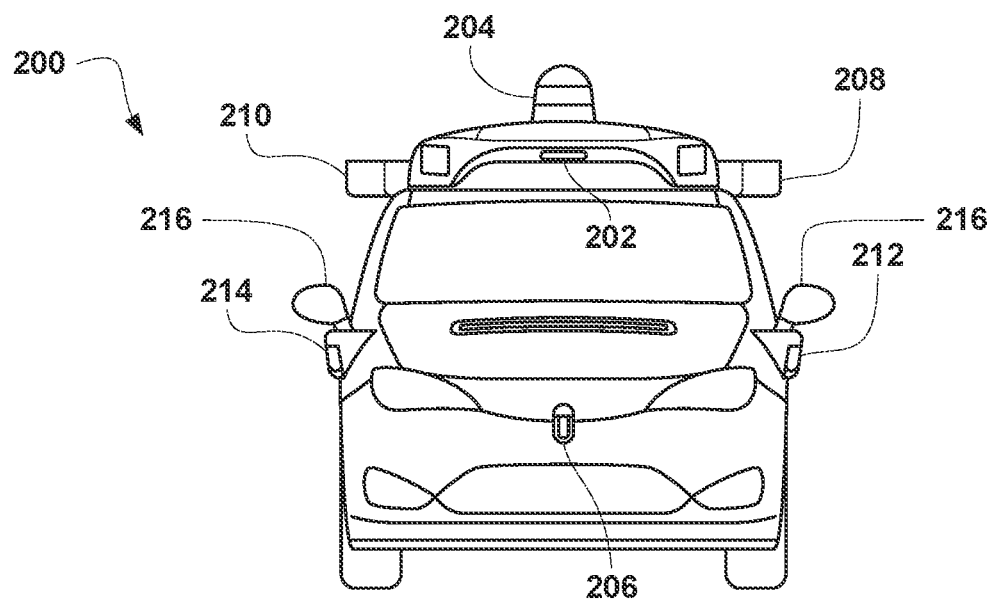
FIG. 2C is an illustration of a physical configuration of a vehicle, according to example embodiments.
Figure 2D:
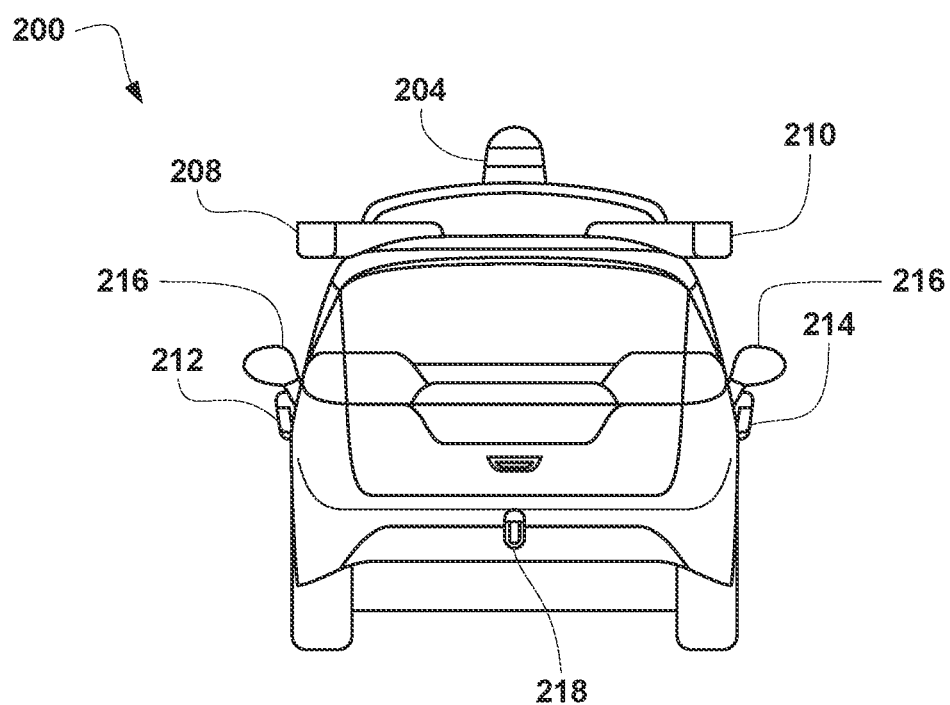
FIG. 2D is an illustration of a physical configuration of a vehicle, according to example embodiments.
Figure 2E:
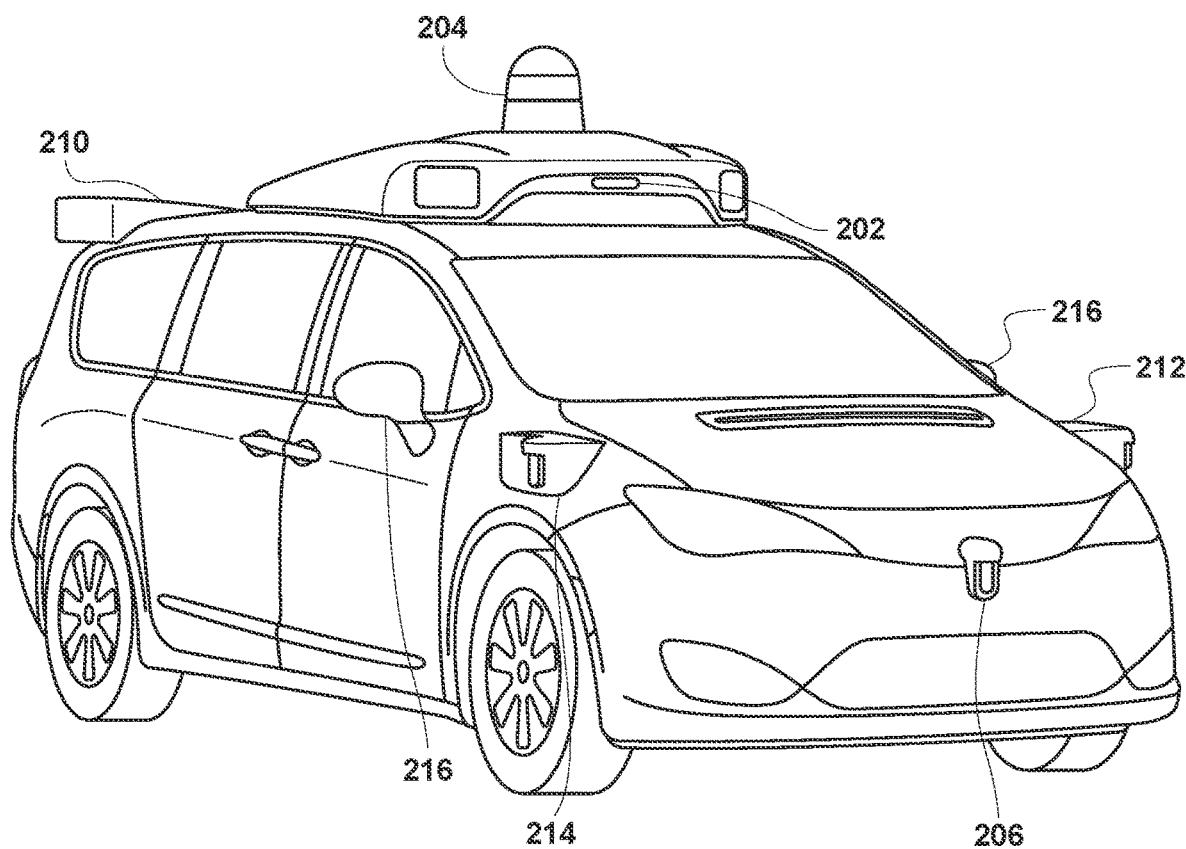
FIG. 2E is an illustration of a physical configuration of a vehicle, according to example embodiments.
Figure 2F:
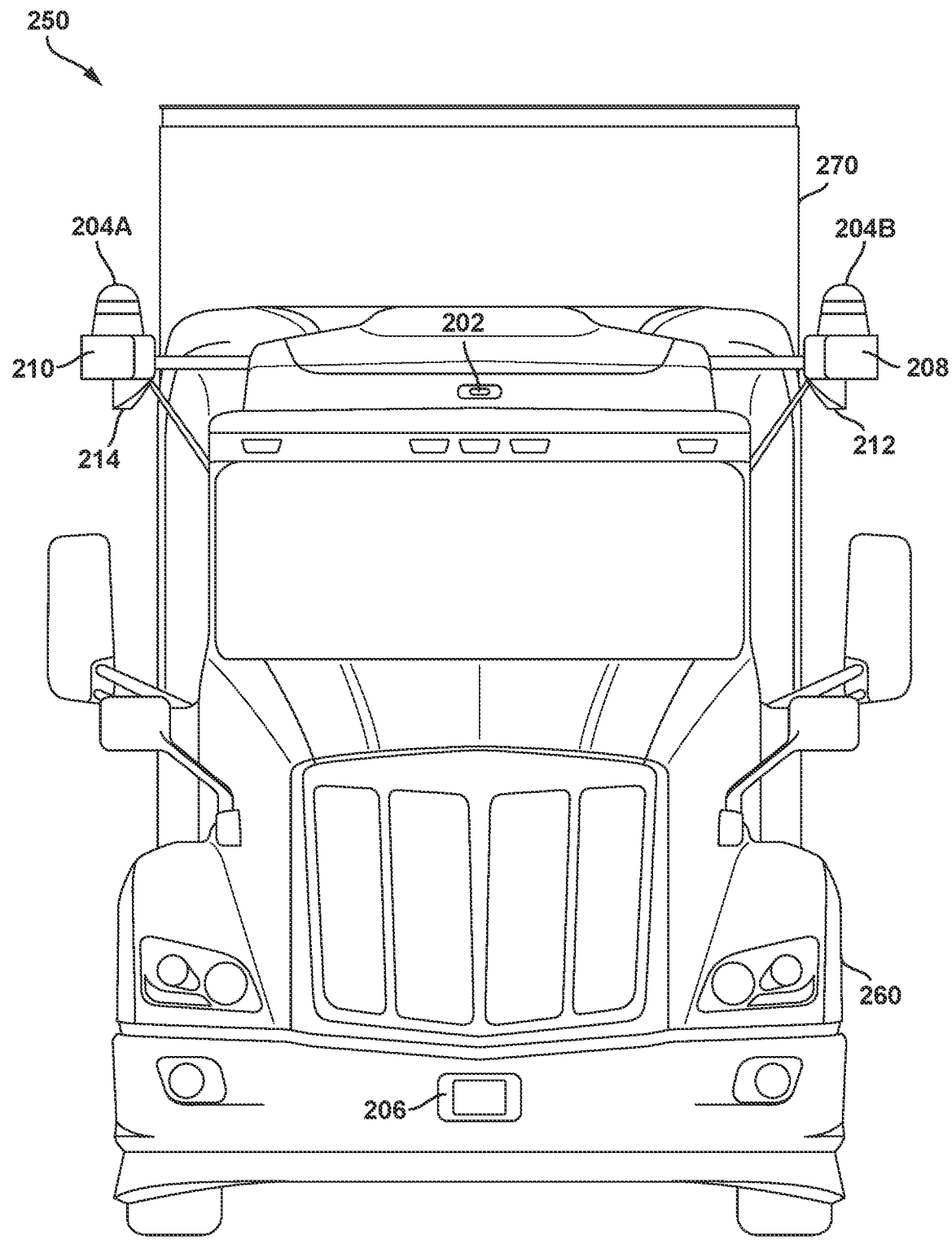
FIG. 2F is an illustration of a physical configuration of a vehicle, according to example embodiments.
Figure 2G:
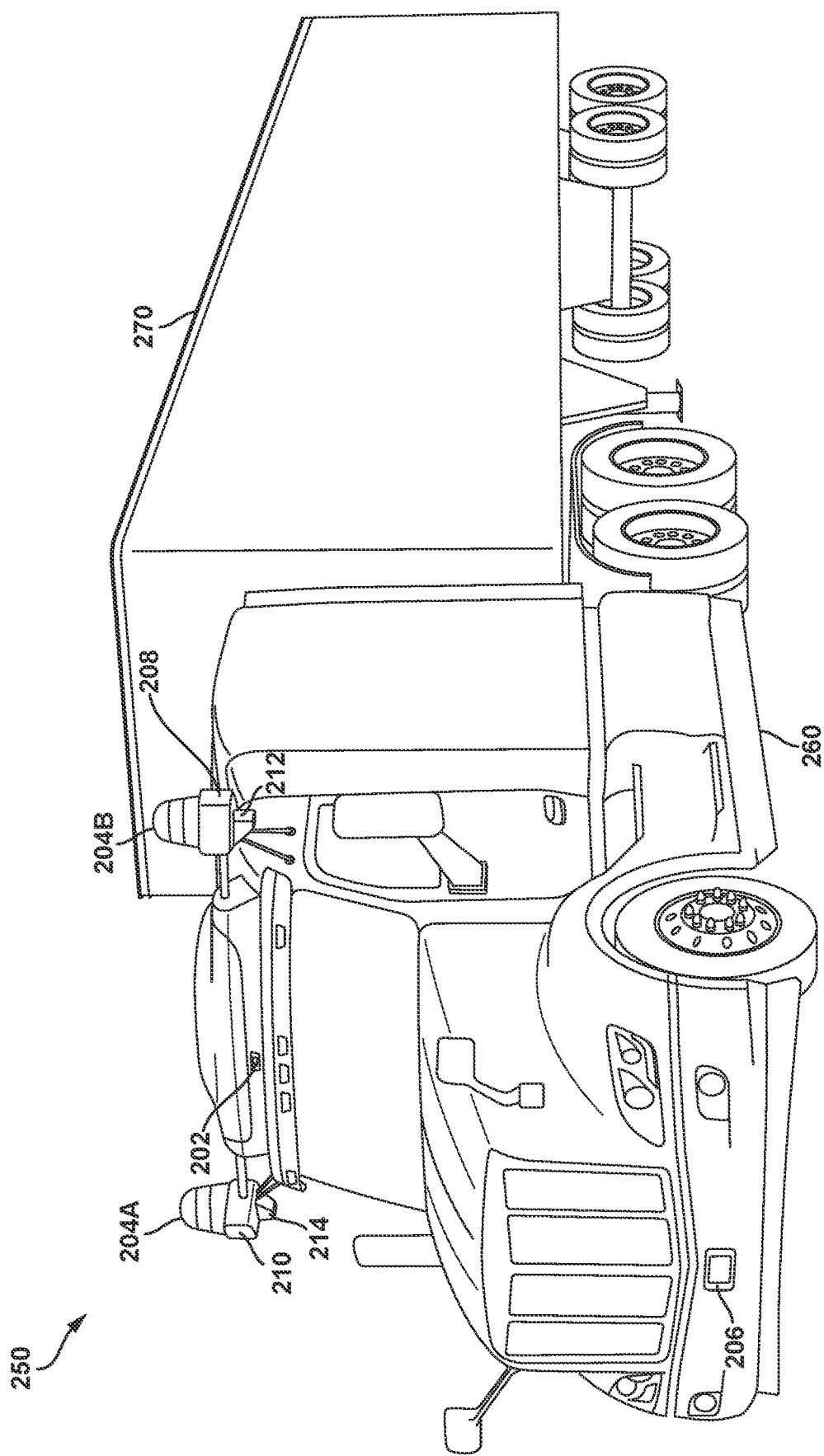
FIG. 2G is an illustration of a physical configuration of a vehicle, according to example embodiments.
Figure 2H:
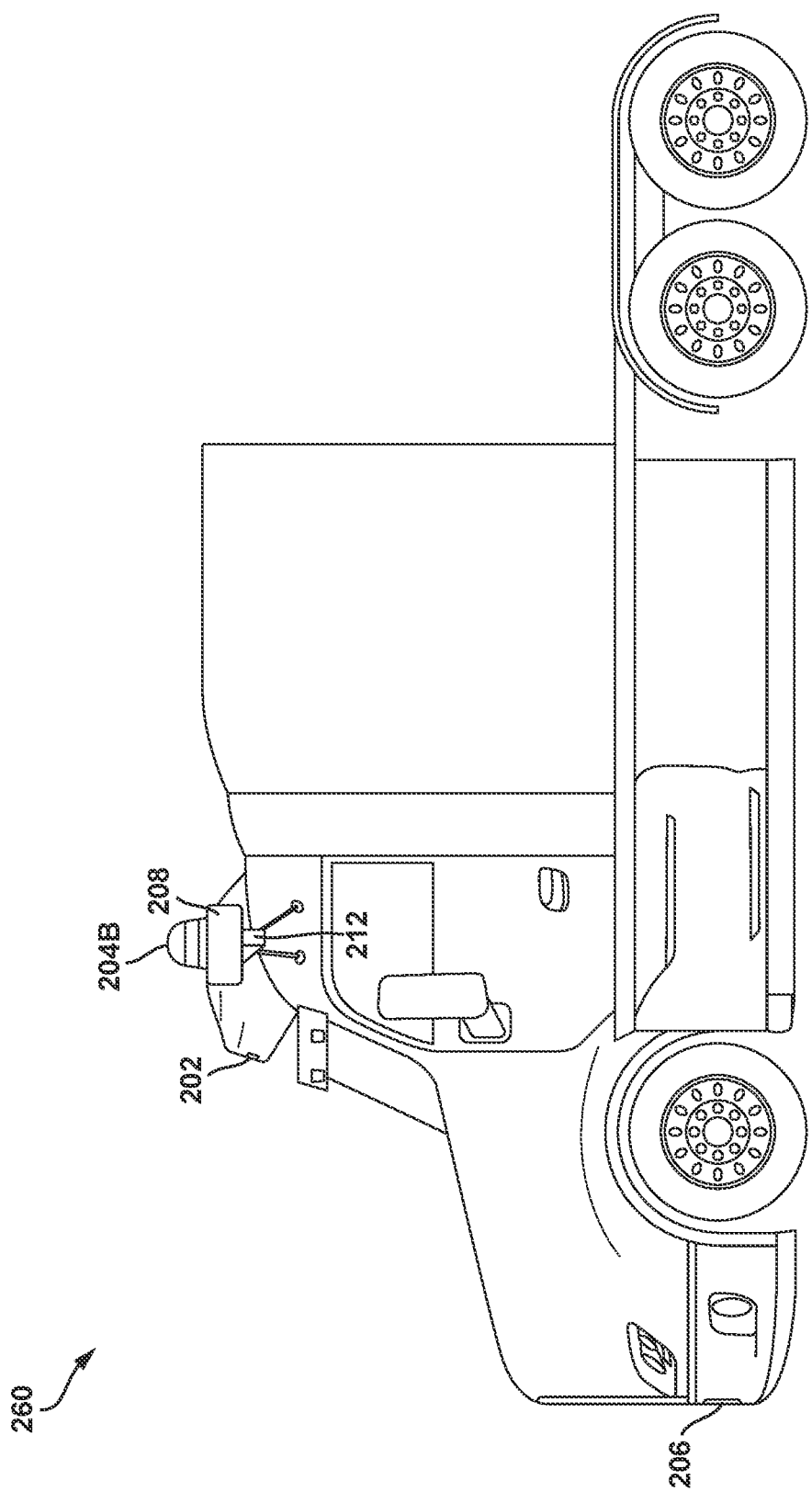
FIG. 2H is an illustration of a physical configuration of a vehicle, according to example embodiments.
Figure 2I:
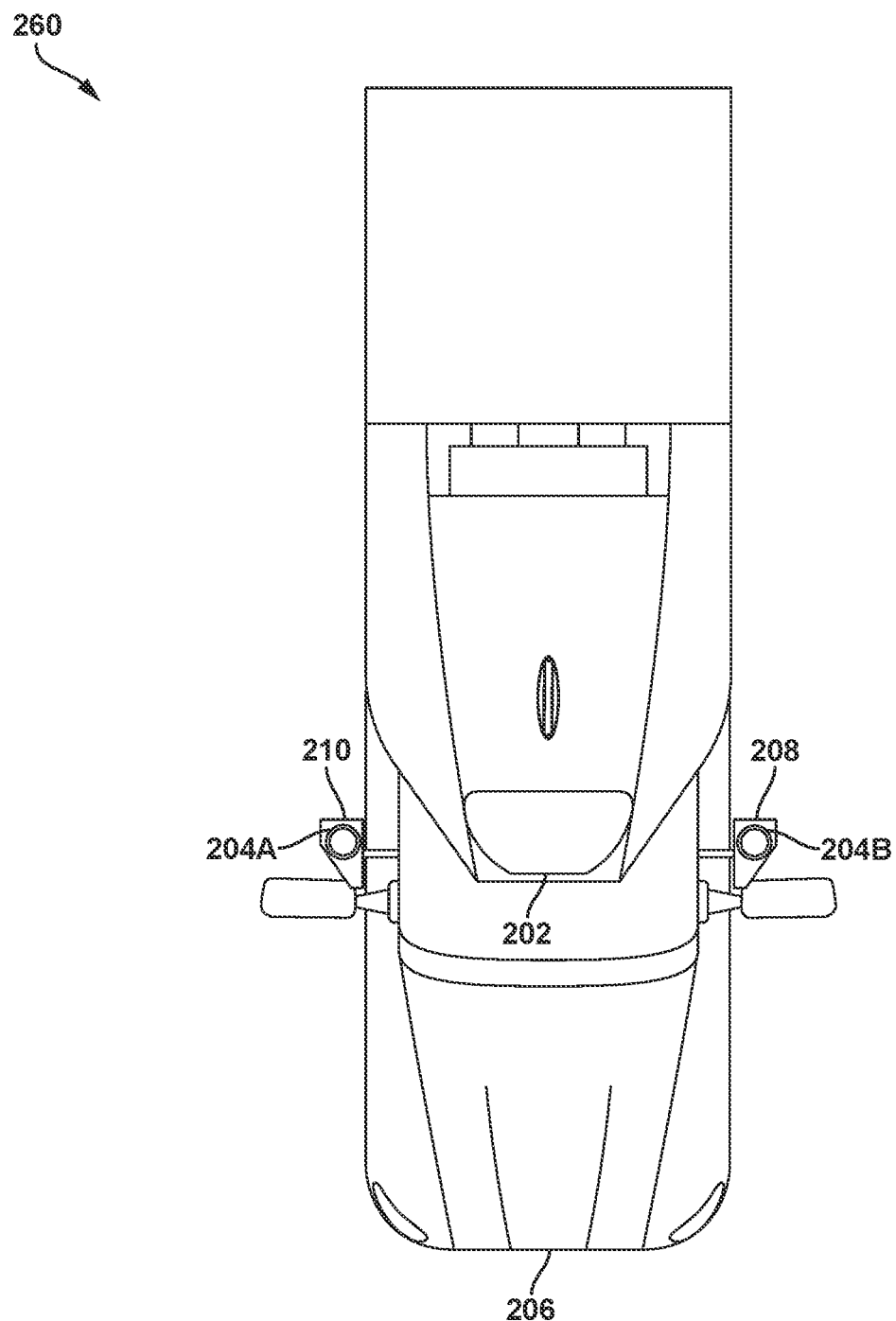
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

Figure 2J:
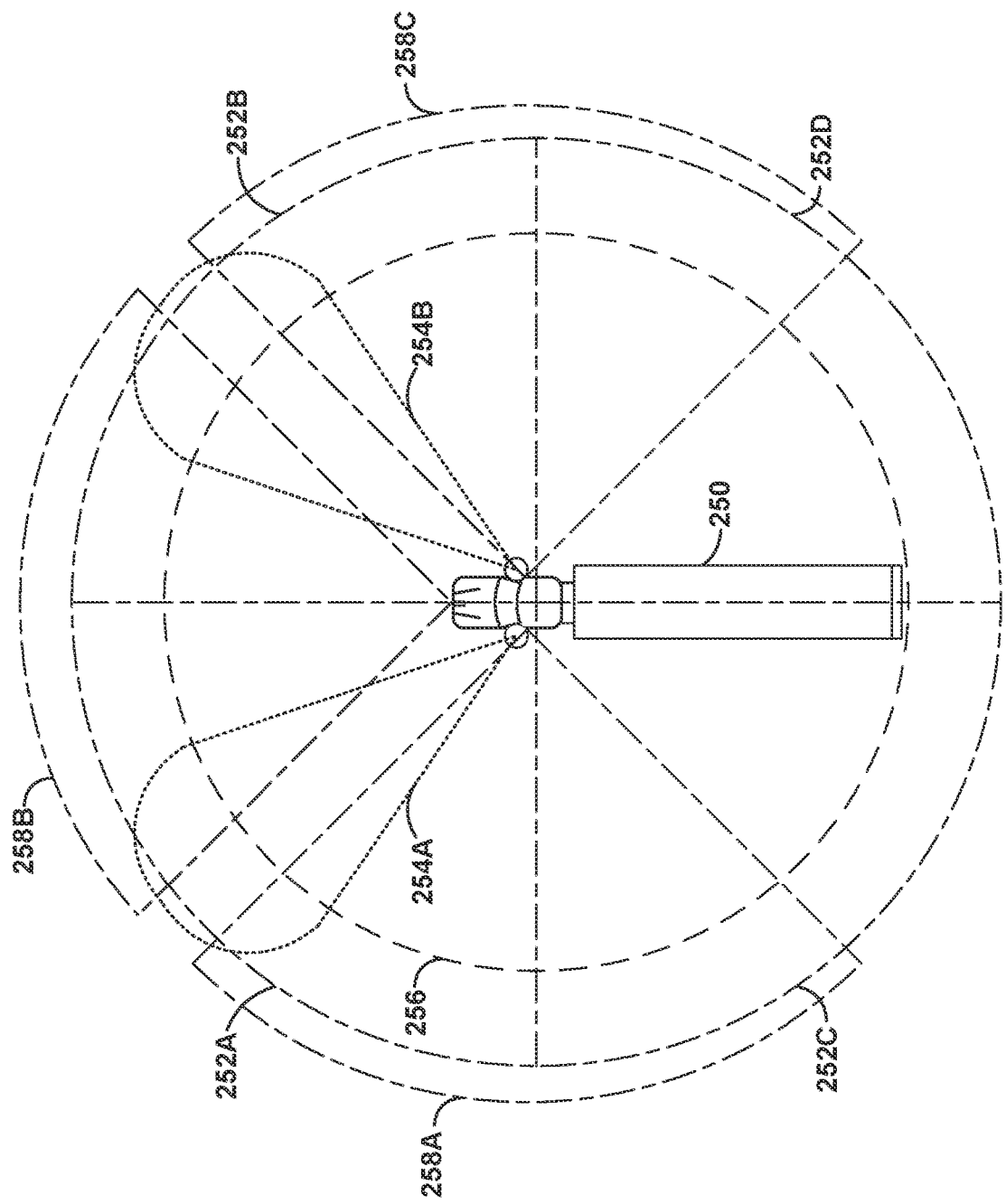
FIG. 2J is an illustration of a field of view for various sensors, according to example embodiments.

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2.1 illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
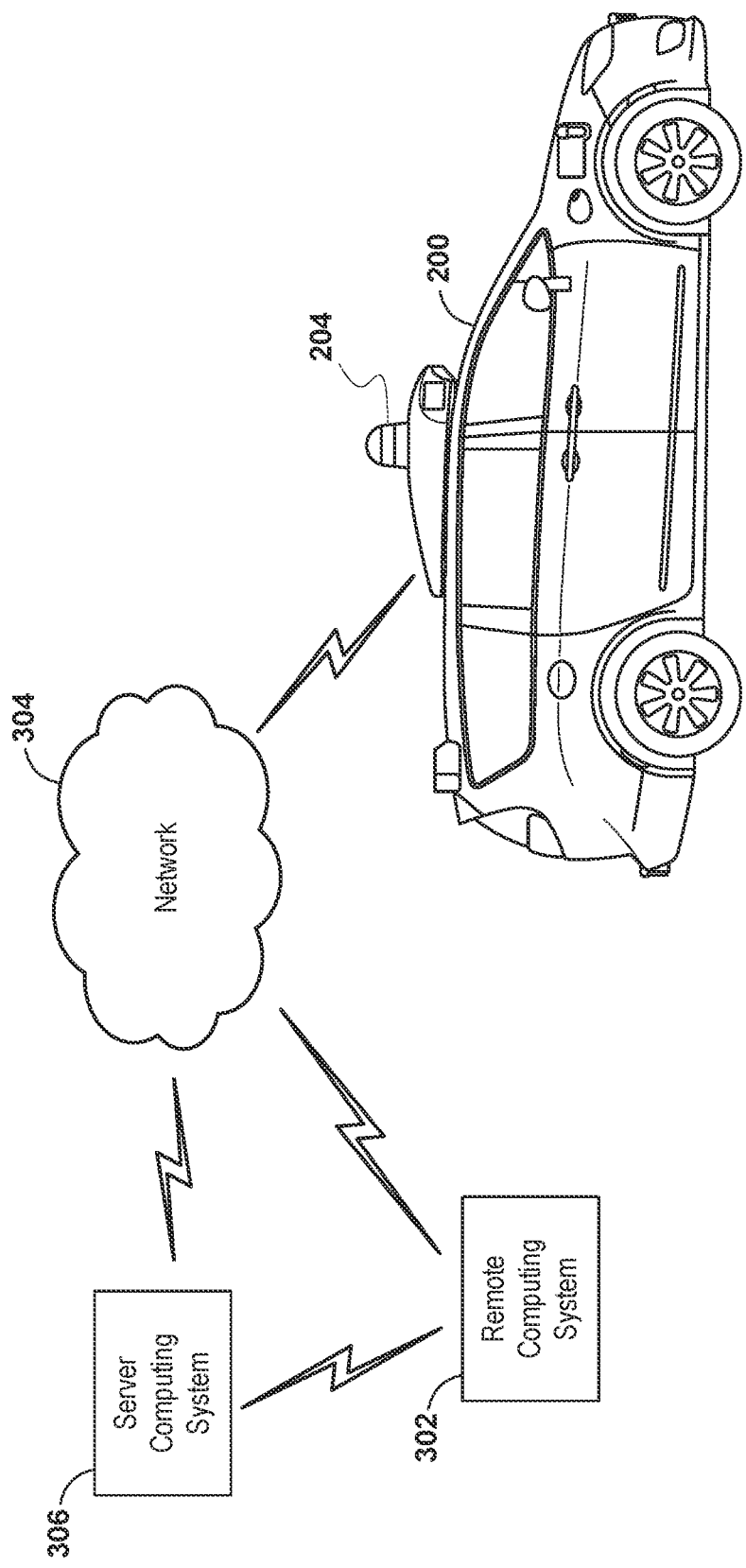
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, and a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environmental data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
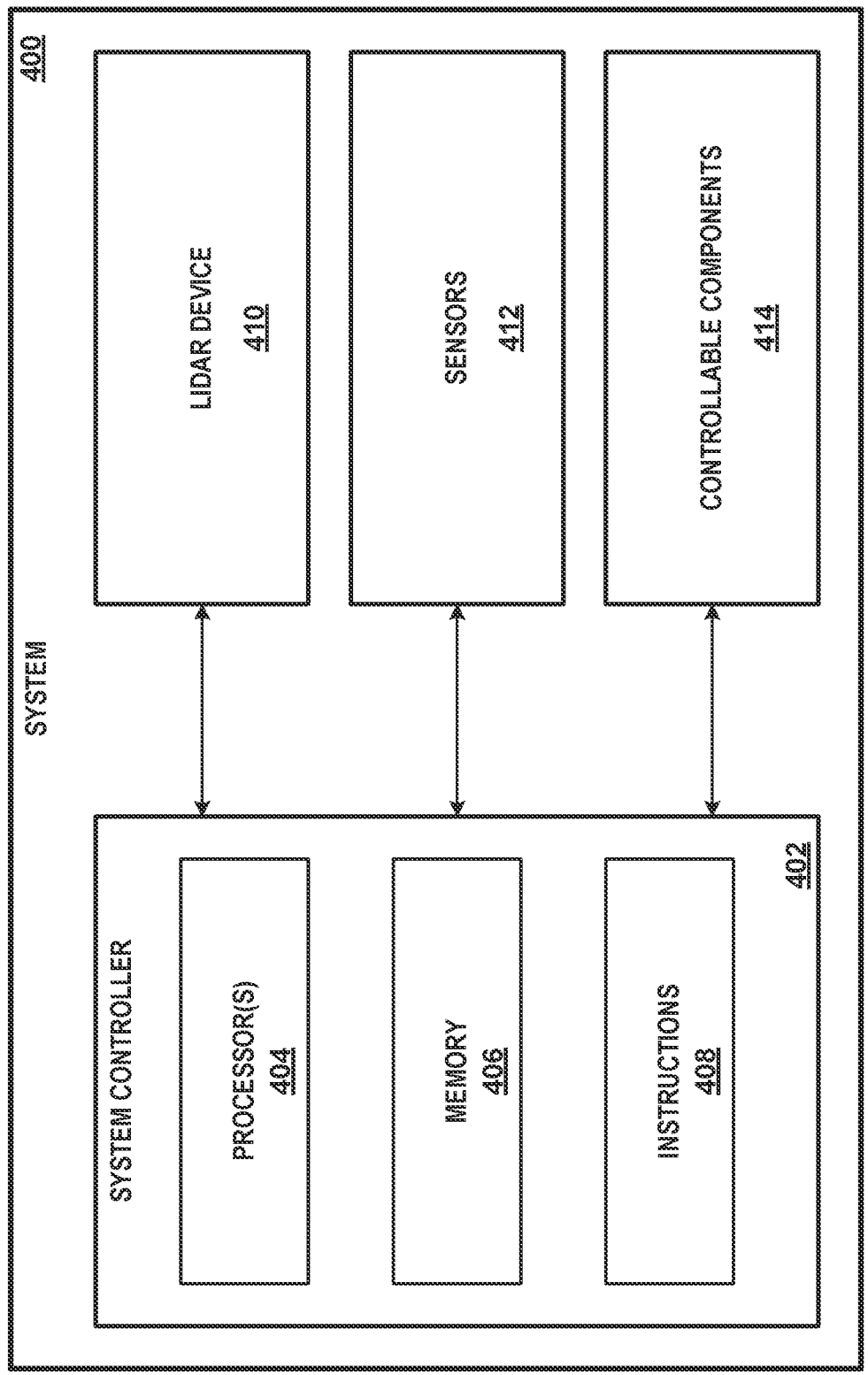
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, and proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
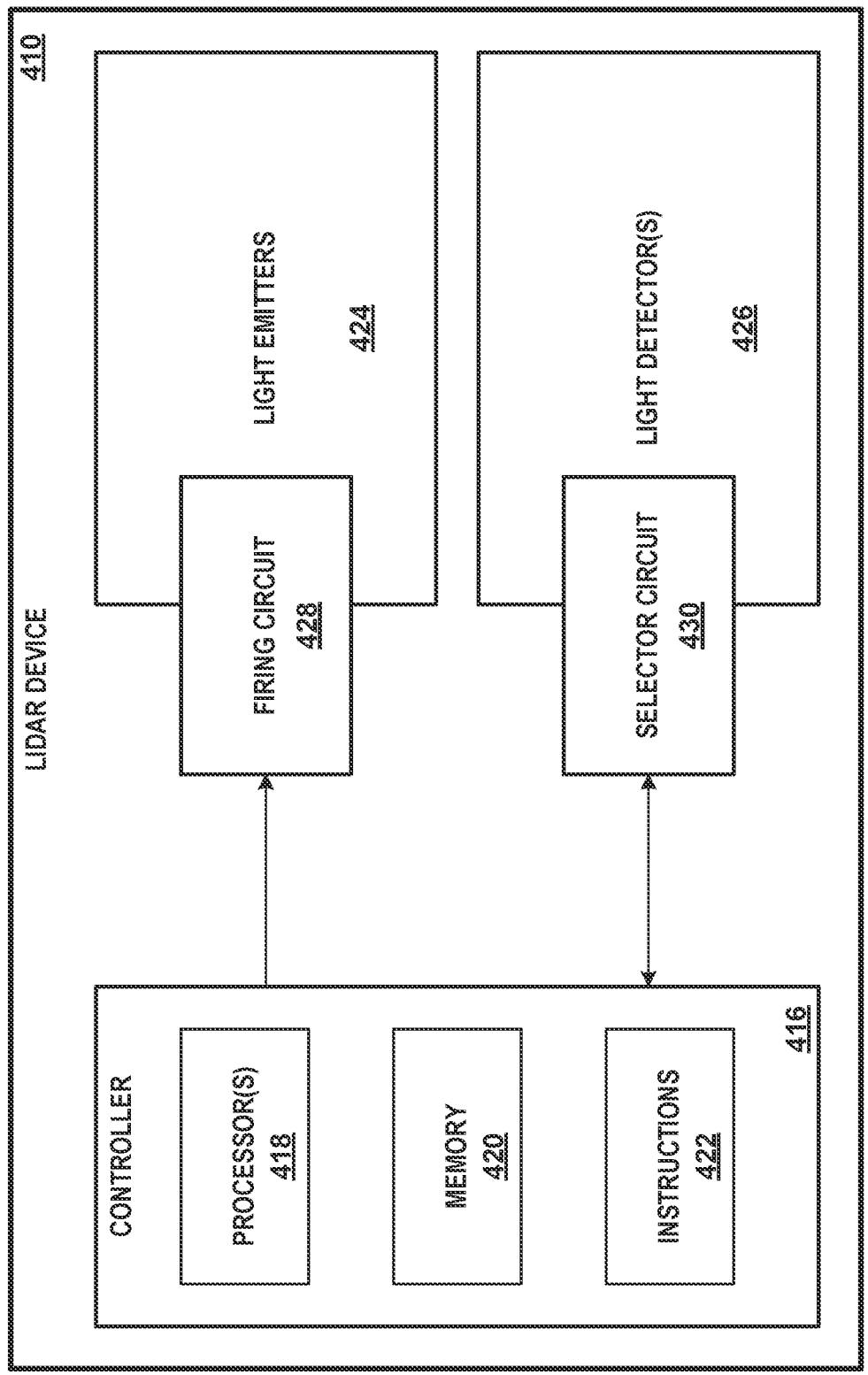
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, etc. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

Figure 5A:
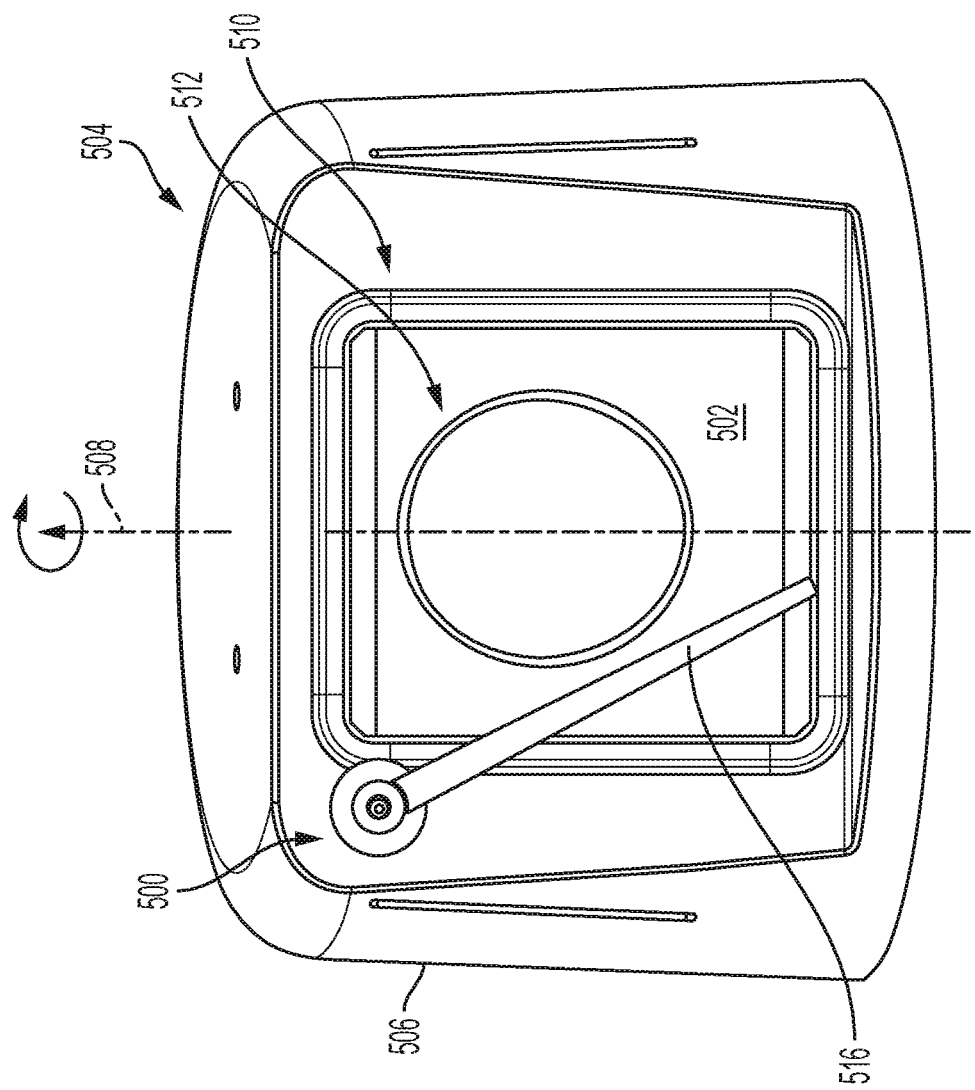
FIG. 5A shows a front view of a sensor housing having a wiper device, according to an example embodiment.
Figure 5B:
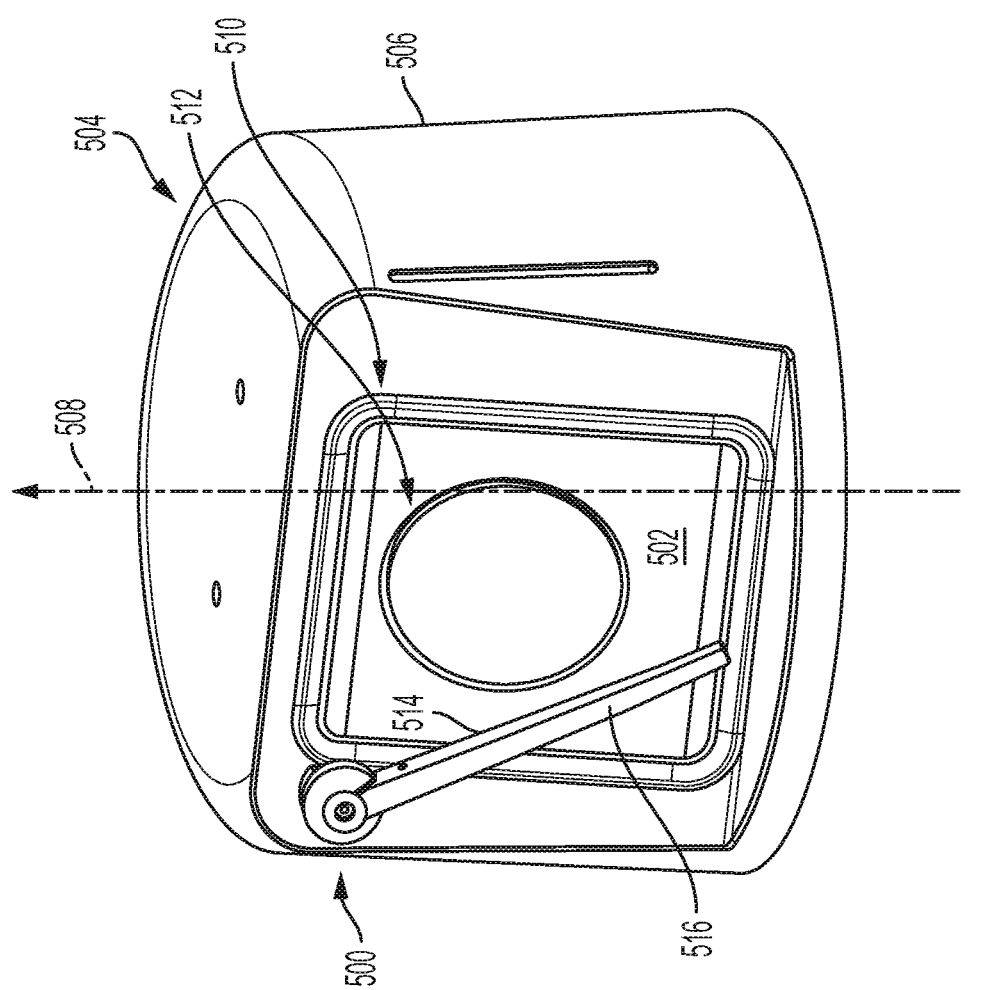
FIG. 5B shows a perspective view of the sensor housing of FIG. 5A.

FIGS. 5A-5H illustrate a wiper device or system 500, according to an exemplary embodiment. As shown in FIGS. 5A and 5B, the wiper device 500 may be configured to wipe a surface 502 of a sensor system 504. The sensor system 504 may be a lidar device or any other sensor system. For example, the sensor system 504 may correspond to one or more of the sensor systems shown in FIGS. 2A-E. The sensor system 504 may be attached to a vehicle for detecting objects or surfaces in an environment. For example, the sensor system 504 may be mounted to a top of the vehicle or located at the front of the vehicle. In other examples, the sensor system 504 may be located in various different positions throughout the vehicle. When the sensor system 504 is mounted to a vehicle, moisture and debris may accumulate on the sensor system 504 as the vehicle travels in the environment. The wiper device 500 may be mounted to the sensor system 504 to wipe a surface of the sensor system 504.

The sensor system 504 may be configured to capture portions of the surrounding environment and may determine an aspect of one or more objects (e.g., location and shape) in the environment of the sensor system 504. The sensor system 504 may include a sensor housing or radome 506 and one or more internal sensor components (e.g., cameras, lidar devices, radar devices, and other sensor equipment) positioned within the sensor housing 506. The sensor housing 506 may protect the internal sensor components of the sensor system 504 from environmental conditions. The internal sensor components positioned within the sensor housing 506 may transmit and receive one or more sensor signals through the sensor housing 506 of the sensor system 504.

In some embodiments, the sensor system 504 may be configured to scan the environment by rotating 360 degrees about an axis (e.g., vertical axis). For example, the sensor housing 506 of the sensor system 504 may rotate or spin about a central axis 508 to provide a 360 degree field of view of the environment surrounding the sensor system 504. The central axis 508 may extend through the sensor housing 506 in a direction perpendicular to the planar bottom surface of the sensor housing 506. Although the sensor housing 506 may be rotated counterclockwise about the central axis 508, additionally or alternatively, the sensor housing 506 may be rotated in a clockwise direction. As the sensor housing 506 of the sensor system 504 rotates, the sensor system 504 may continually transmit and receive signals about the surrounding environment. By rotating the sensor housing 506 of the sensor system 504, a three-dimensional map of a 360 degree view of the environment of the sensor system 504 may be determined.

The sensor housing 506 of the sensor system 504 may be configured to rotate at a predetermined rate of speed and capture a particular range of the surrounding environment. In some embodiments, the sensor system 504 may be configured to rotate at one or more predetermined speeds. The sensor system 504 may be mounted on a rotatable platform (not shown) that can rotate the sensor housing 506 about the central axis 508. A drive mechanism or motor (not shown) may be used to rotate the platform about the central axis 508. Additionally or alternatively, the platform may be configured to tilt the axis of rotation of the sensor system 504 to control the field of view of the sensor system 504. In some embodiments, the sensor system 504 may be rotated back and forth along a portion of the 360 degree view of the sensor system 504. For example, the sensor system 504 may be configured to rotate about the central axis 508 without making a complete rotation.

As shown in FIGS. 5A and 5B, the sensor housing 506 of the sensor system 504 may be configured to have a substantially cylindrical shape. Although the sensor housing 506 is shown as having a substantially cylindrical shape, the sensor housing 506 of the sensor system 504 may be configured in various shapes and sizes. Further, the sensor housing 506 may be formed from any material capable of supporting and protecting the various internal sensor components of the sensor system 504. For example, the sensor housing 506 may be formed from materials such as plastic, glass, polycarbonate, polystyrene, acrylic, polyester, etc. The sensor housing 506 may also be coated with other materials that range between being opaque and transparent.

Figure 5C:
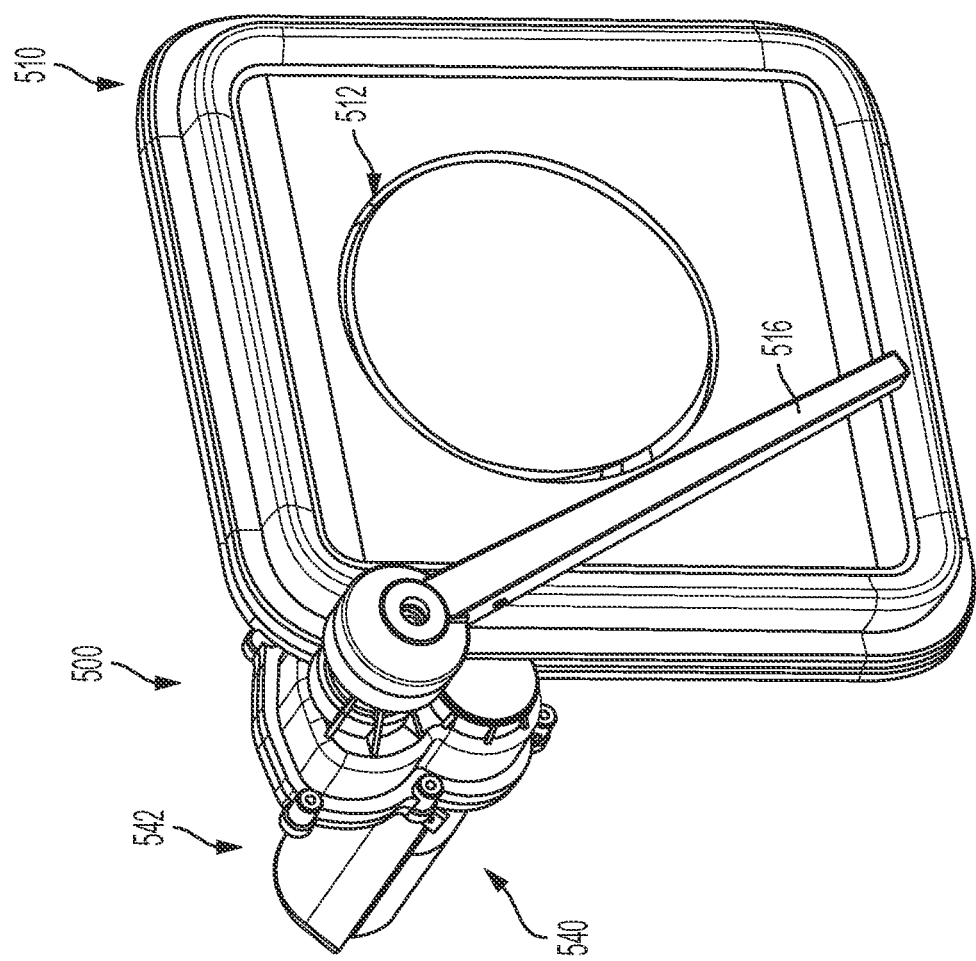
FIG. 5C shows a perspective view of a wiper device for wiping a window of a sensor housing, according to an exemplary embodiment.

Referring to FIGS. 5A and 5B, the sensor housing 506 of the sensor system 504 may have a window assembly 510 through which the internal sensor components of the sensor system 504 may transmit and receive signals. In some embodiments, the sensor housing 506 may include multiple window assemblies. As shown in FIGS. 5A-5C, the window assembly 510 has a rectangular shape and may have a planar surface or a curved surface. Although the window assembly 510 is shown as having a rectangular shape, the window assembly 510 may be of any shape. The window assembly 510 may be composed of the same or different material as the sensor housing 506. For example, the window assembly 510 may be comprised of materials that permit transmissions of sensor signals, such as plastic, glass, polycarbonate, polystyrene, acrylic, polyester, etc.

The window assembly 510 may include a lens or window 512. The lens 512 may be substantially circular and may be composed of any suitable material. For example, the lens 512 may be formed from materials such as plastic, glass, polycarbonate, polystyrene, acrylic, polyester, etc. The internal sensor components of the sensor system 504 may be positioned behind the lens 512 and may transmit and receive signals through the lens 512 of the sensor housing 506. The functions of the internal sensor components may be impacted as debris and moisture accumulate on the lens 512 of the sensor system 504 as described above.

As shown in FIGS. 5A and 5B, the wiper device 500 may be attached or mounted to the sensor housing 506 to engage and wipe the lens 512 of the sensor system 504. The wiper device 500 may be positioned adjacent to the window assembly 510 of the sensor system 504 and may extend in a generally downward direction in a stowed position. The wiper device 500 may be activated to clear moisture and/or debris that may appear on the lens 512 of a sensor system 504 to maintain a clear field of view for the internal sensor components within the sensor housing 506. For example, the wiper device 500 may be coupled to the sensor housing 506 such that the wiper device 500 can loosen, pull, and/or push away the moisture and debris built up on the lens 512 of the sensor housing 506.

The wiper device 500 may be configured to receive commands, for instance via a wired or wireless connection. For example, the wiper device 500 may receive a command to activate the wiper device 500 to wipe the lens 512 of the sensor system 504. In some embodiments, the wiper device 500 may be activated when moisture or debris is detected on the lens 512 of the sensor system 504 and may be deactivated when the lens 512 of the sensor system 504 is determined to be sufficiently cleared. The wiper device 500 may be configured to continuously or periodically clear debris and moisture from a surface of the sensor housing 506. In addition, cleaning and/or lubrication fluid can be applied to the outer surface of the sensor housing 506 of the sensor system 504 to assist with the cleaning or removal process.

As shown in FIG. 5B, the wiper device 500 may be configured to reciprocate a wiper blade 514 over the lens 512 of the sensor system 504. In some embodiments, multiple wiper blades may be attached to the wiper device 500. The wiper blade 514 may be configured to be in contact with a surface of the sensor housing 506 to wipe the lens 512 of the sensor housing 506 of the sensor system 504. The curvature of the wiper blade 514 may be symmetrical or asymmetrical depending on the force requirements (as described below) and the contour of the sensor housing 506. The wiper blade 514 of the wiper device 500 may be comprised of materials capable of moving and removing moisture and debris, such as rubber (e.g., buna, ethylene propylene diene monomer (EPDM), and silicone) or plastic (e.g., urethane, and polyethylene). The wiper blade 514 may also be comprised of a solid or sponge-like foam or fabric (e.g., woven fabric and felted fabric). The wiper blade 514 may be configured to move in a continuous arc-like path between a first position and a second position over the sensor housing 506 of the sensor system 504. As the wiper blade 514 reciprocates from the first position to the second position, the wiper blade 514 may clear the lens 512 of the sensor system 504 of moisture and debris.

Figure 5D:
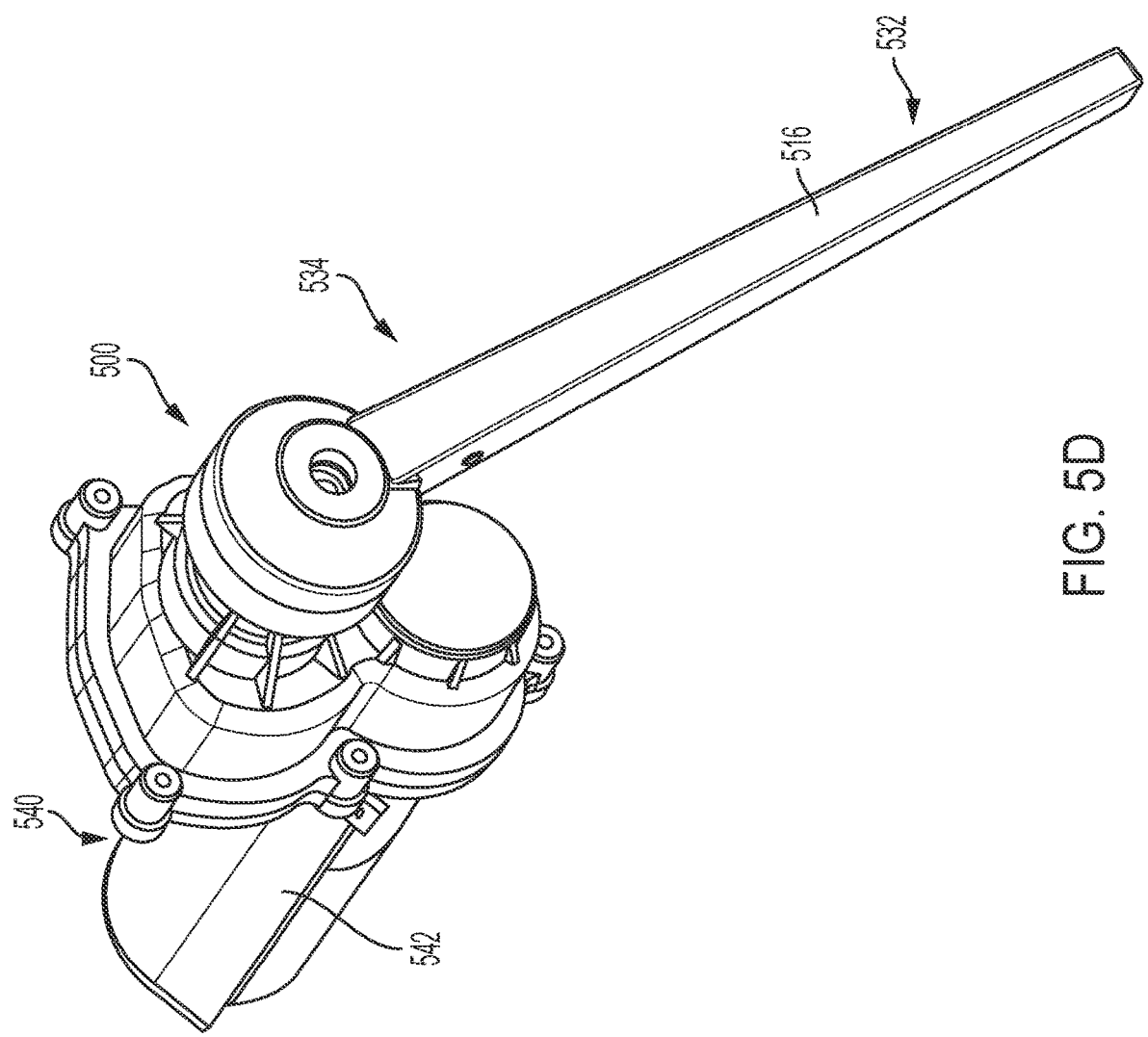
FIG. 5D shows a perspective view of the wiper device of FIG. 5C.
Figure 5E:
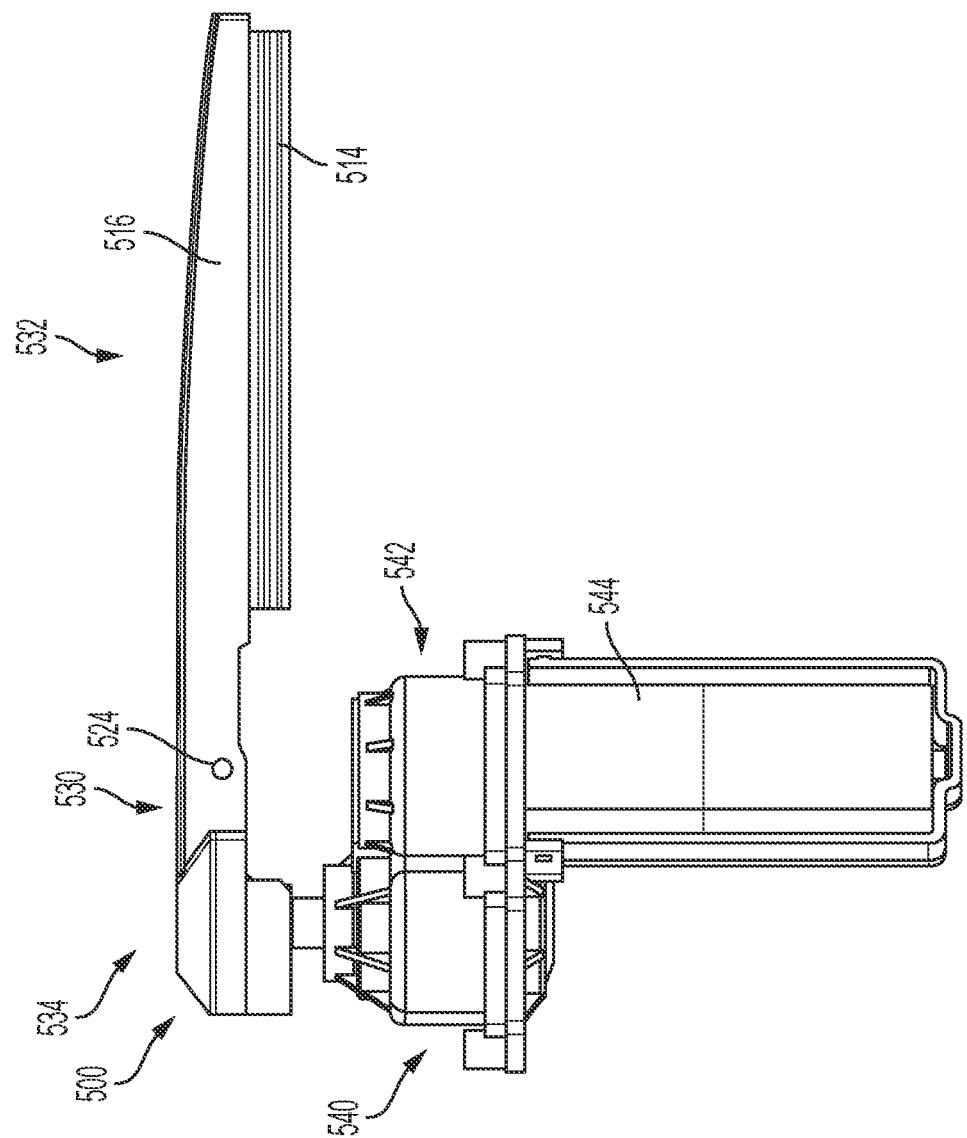
FIGS. 5E-5H shows various views of the wiper device of FIG. 5C.
Figure 5F:
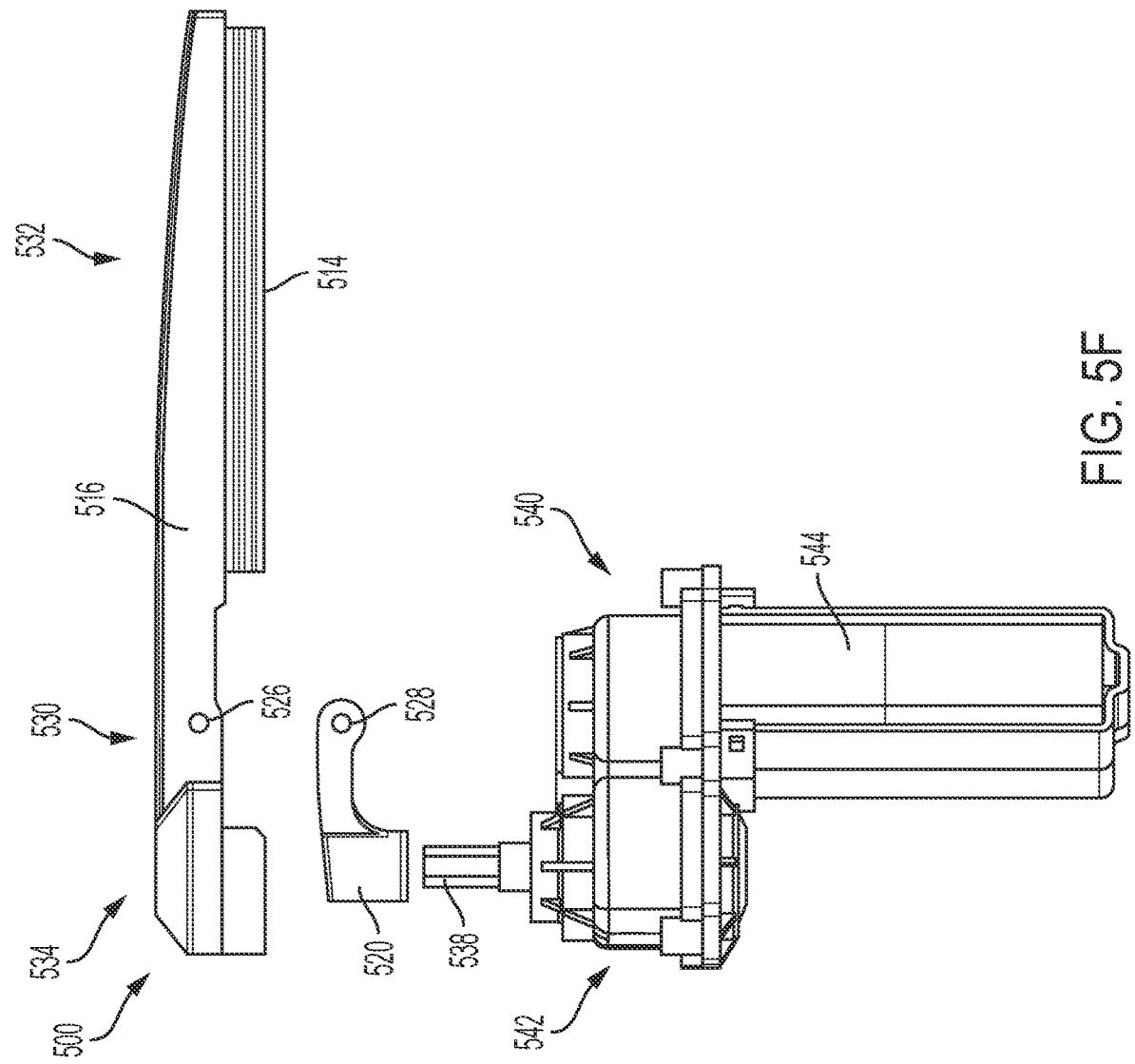
Figure 5G:
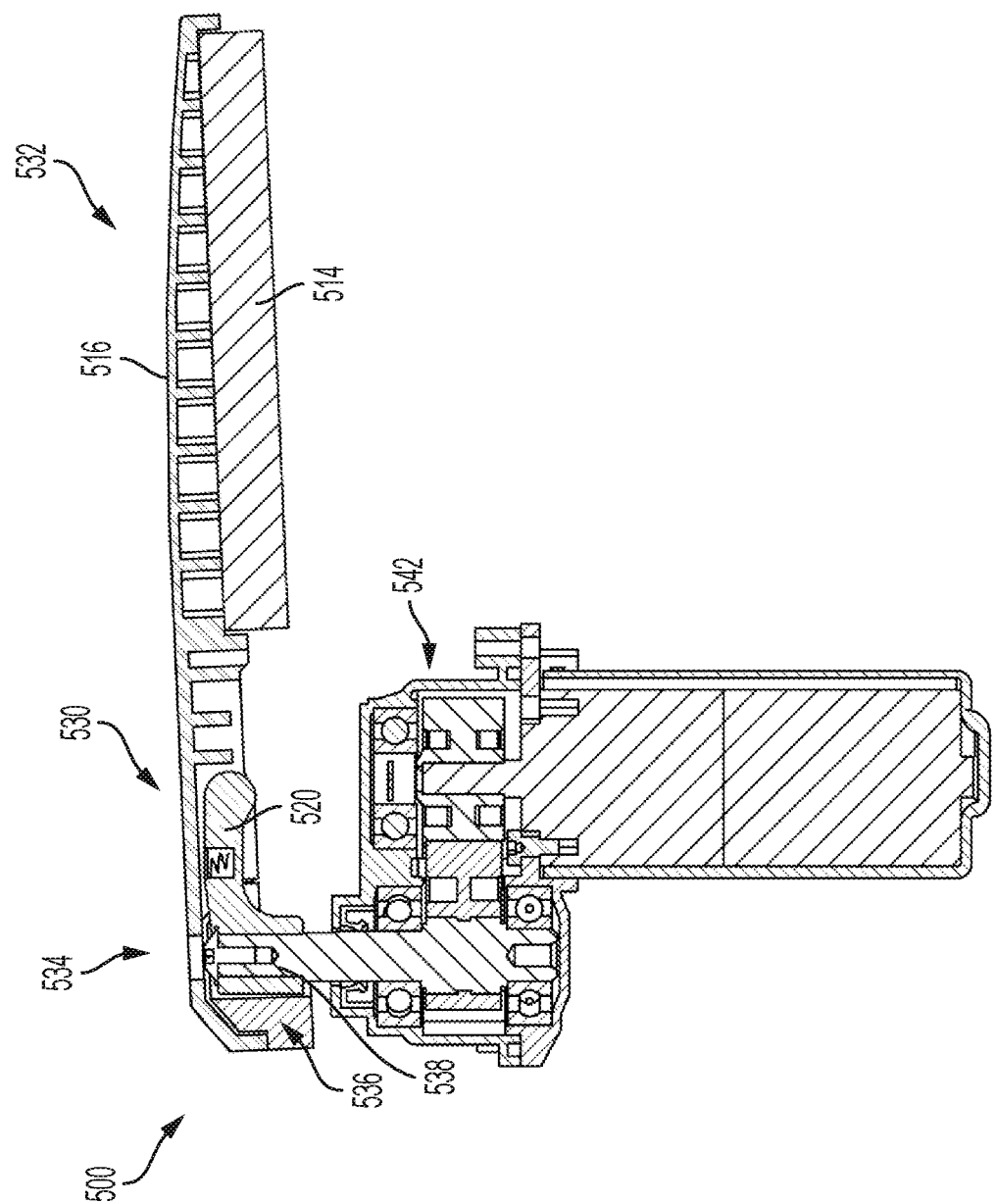
Figure 5H:
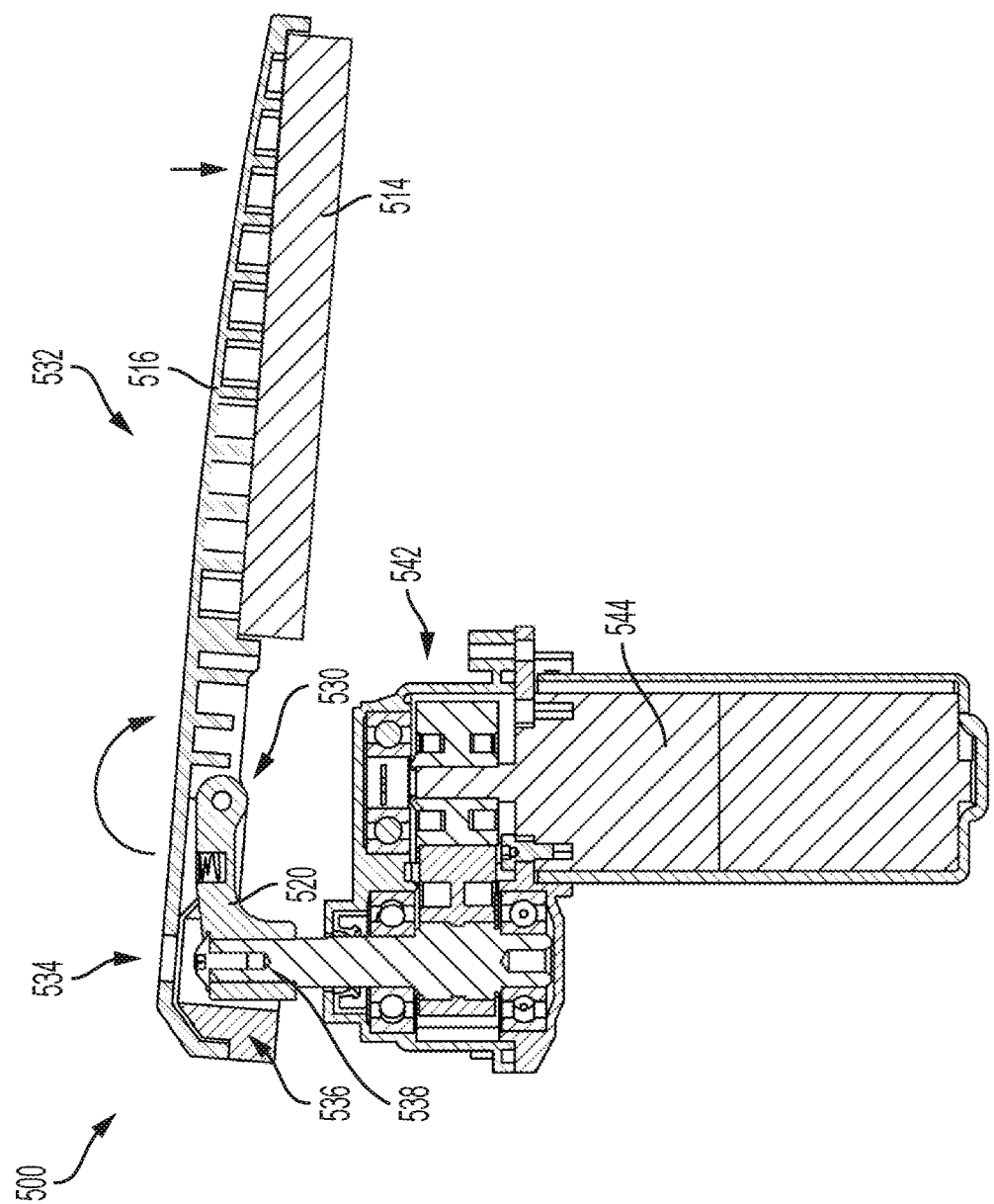

Referring to FIGS. 5C-5H, the wiper blade 514 of the wiper device 500 may be coupled or connected to the wiper arm 516. The wiper arm 516 may be made of rigid materials, such as metals, plastics, etc. As shown in FIGS. 5F-5H, a driving arm or connecting member 520 of the wiper device 500 may be pivotally or hingedly connected to the wiper arm 516. For example, a pin or screw 524 can extend through the openings 526 of the wiper arm 516 (one being shown) and the opening 528 in the driving arm 520 to pivotally connect the wiper arm 516 to the driving arm 520 as shown in FIGS. 5E and 5F. The pivotal connection 530 may be located between the front region 532 and a rear region 534 of the wiper arm 516 and may enable the wiper arm 516 to move or pivot about the pivotal connection 530. For example, the wiper arm 516 may pivot or rotate about the pivotal connection 530 so that the wiper blade 514 may be pressed against the sensor housing 506 of the sensor system 504. As shown in FIG. 5G, the wiper arm 516 may be oriented in a substantially horizontal orientation and may be positioned at a distance spaced apart from the sensor housing 506, when in a stowed position. When the sensor housing 506 of the sensor system 504 is rotated, the wiper arm may move downward as shown in FIG. 5H to cause the wiper blade 514 to contact and engage with the sensor housing 506 as further described below.

As shown in FIGS. 5G and 5H, the wiper arm 516 of the wiper device 500 may include a channel or recess 536 configured to accommodate the driving arm 520. The driving arm 520 of the sensor system 504 may be coupled or attached to an end of a rotatable shaft 538 of a drive assembly 540. The rotatable shaft 538 of the drive assembly 540 may extend through the sensor housing 506. As shown in FIGS. 5C-5D, the drive assembly 540 may be mounted in the interior of the sensor housing 506 and may be positioned at or adjacent to a top of the window assembly 510 of the sensor system 504. Alternatively, the drive assembly 540 may be positioned at or adjacent to a bottom of the window assembly 510 or one of the lateral edges of the window assembly 510 of the sensor system 504.

Referring to FIGS. 5E-5H, the drive assembly 540 may include a housing 542 and a motor 544. The motor 544 may be an electric motor and may drive the driving arm 520 of the wiper device 500 to cause the wiper blade 514 to reciprocate in a back and forth motion over the surface of the sensor housing 506. For example, the driving arm 520 may be driven by the motor 544 of the drive assembly 540 to reciprocate the wiper blade 514 between a first position and a second position on the surface of the sensor housing 506. It will be recognized that any suitable motor having a rotatable drive shaft may be used to rotate the driving arm 520. In some embodiments, the motor 544 of the drive assembly 540 may be configured to drive the wipe blade 514 at a range of speeds. As an example, the motor 544 may be configured to move the wiper blade 514 at a first speed when passing through a field of view of the internal sensor components of the sensor system.

When the sensor housing 506 of the sensor system 504 is stationary, the wiper device 500 may be in a stowed position in which the wiper blade 514 is in contact or pressed against with the sensor housing 504. For example, the wiper device 500 may be configured in a stowed position where the wiper blade 514 is pressed against or engaged with the surface of the sensor housing 506. In this arrangement, when the sensor housing 506 rotates or spins, the wiper arm 516 may be configured to apply a force to maintain the wiper blade pressed against the surface of the sensor housing 506 as further described below. When the wiper blade 514 is pressed against the sensor housing 506, the wiper device 500 may be activated to reciprocate the wiper blade 514 over the surface of the sensor housing 506.

In other embodiments, the wiper blade 514 may be spaced apart from the sensor housing 506 of the sensor system 504 when the wiper device 500 is configured in a stowed position. For example, the wiper blade 514 may not be in contact or engaged with the surface of the sensor housing 506 when stowed. In this arrangement, to deploy the wiper blade 514 on the sensor housing 506, the wiper arm 516 may be configured to apply a force, when the sensor housing 506 rotates or spins, to cause the wiper blade 514 to be deployed so that the wiper blade 514 contacts and presses against the sensor housing 506 of the sensor system 504. For example, when the sensor housing 506 spins, the weight of the rear region 534 of the wiper arm 510 may force the wiper arm 516 to pivot about the pivotal connection 530 causing the wiper blade 514 to be pressed against the sensor housing 506. As such, the wiper system 514 may be configured to enable the wiper blade 514 to apply sufficient pressure on the surface of the sensor housing 506 to clear moisture and debris from the surface of the sensor housing 506. Once the wiper blade 514 is engaged with or pressed against the sensor housing 506, the wiper blade 514 may be activated to reciprocate over the surface of the sensor housing 506.

Figure 6:
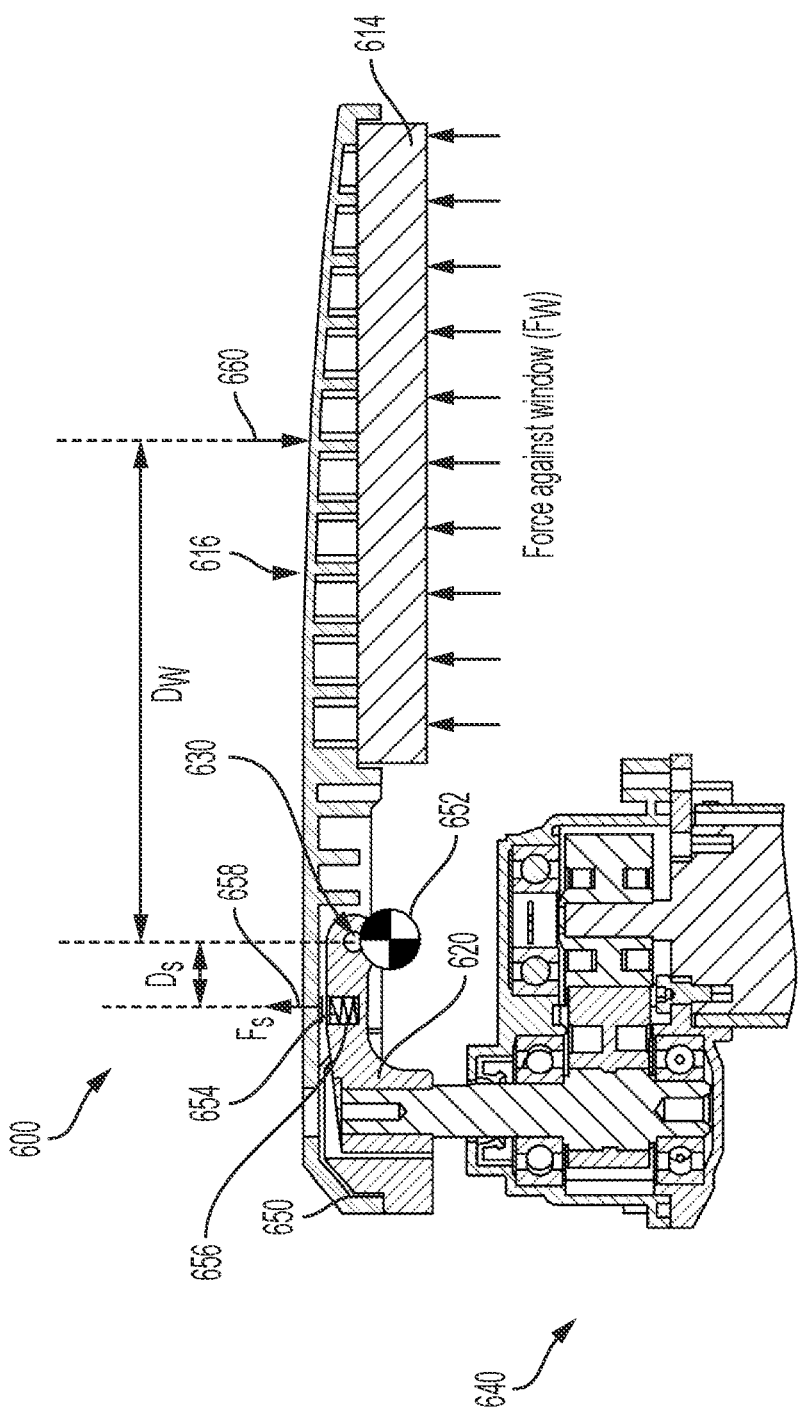
FIG. 6 shows a partial cross-sectional front view of another wiper device, according to an example embodiment.

Referring to FIG. 6, a wipe device or system 600 for wiping a surface of a sensor housing is shown, according to an exemplary embodiment. The wiper system 600 includes a wiper blade 614, a wiper arm 616, a driving arm 620, and a drive assembly 640. The wiper device 600 may correspond in many aspects to the wiper device 500 shown in FIGS. 5A-5H. The wiper blade 614 may be attached to a front region of the wiper arm 616 and the driving arm 620 may be pivotally or hingedly connected to the wiper arm 616. The wiper arm 616 may include a weight or counterbalance 650 coupled at or near the rear region of the wiper arm 616. For example, the wiper arm 616 may be configured with the weight or counterbalance 650 on one side of the pivotal connection 630 and the wiper blade 614 on the opposite side of the pivotal connection 630. The wiper arm 616 may be balanced about the pivot connection 630 so that the wiper arm 616 has a center of gravity 652 at the pivotal connection 630. For example, the counterbalance 650 may have a predetermined weight so that the wiper arm 616 has a center of gravity 652 at the pivotal connection 630. As such, the load or forces associated with the wiper arm 616 are approximately equal on either side of the pivotal connection 630. Thus, the center of gravity 652 of the wiper arm 616 may correspond to the pivotal connection 630. In other embodiments, the center of gravity 652 of the wiper arm 616 may be offset or spaced at a distance from the pivotal connection 630 as further described below.

As shown in FIG. 6, the wiper device 600 may include a biasing member 654 (e.g., a spring) positioned within a recess 656 of the wiper arm 616. The biasing member 654 may be located at a distance $D_s$ from the pivotal connection 630. The biasing member 654 may be configured to provide a force $F_s$ on the wiper arm 616 to cause the wiper blade 614 to contact the surface of the sensor housing and maintain the wiper blade 614 against the surface. For example, the biasing member 654 may be configured to provide a pressure or force $F_s$ (e.g., a preload force) on the rear region of the wiper arm 616 in a direction as indicated by arrow 658 to cause a force $F_w$ to be applied to the wiper blade 614 from the surface of the sensor housing. The force $F_s$ applied by the biasing member 654 will cause the wiper blade 614 to be pressed against the surface of the sensor housing. The force $F_s$ of the biasing member 654 may be applied to the wiper arm 616 when the wiper device 600 is stationary or rotating. When the wiper blade 614 is pressed against the surface of a sensor housing, the force $F_w$ may be distributed across the span or the length of the wiper blade 614. The center of the wiper blade 614 may be positioned at a distance $D_w$ from the pivotal connection 630.

When the sensor housing of the sensor system rotates or spins, the weight or counterbalanced 650 at the rear region of the wiper arm 616 may increase the force $F_s$ applied to the wiper blade 614 causing the force $F_w$ pressed against the wiper blade 614 to increase so that the wiper blade 614 maintains contact and/or is further pressed against the surface of the sensor housing. In other embodiments, the wiper device 600 may not include a biasing member. Rather, weight or counterbalance 650 on the rear end of the wiper arm 616 may be increased to a predetermined weight. For example, the wiper arm 616 may have a center of gravity 652 that is offset by a predetermined distance from the pivotal connection 630 to cause the wiper blade 614 to be pressed against the sensor housing. As a result, the wiper arm 616 may be configured to apply sufficient amount of pressure to the wiper blade 614 while the sensor housing 504 rotates so that the wiper device 600 may clear moisture and debris from the surface of the sensor housing 506. As such, the wiper arm 616 of the wiper device 650 may be configured to cause the wiper blade 614 to be pressed against or contact the surface of the sensor housing 506 while the sensor housing 506 is rotating.

As shown in FIG. 6, when the wiper blade 614 is pressed against a surface of the sensor housing, the force $F_w$ may be applied along the length of the wiper blade 614 against the surface of the sensor housing 506. The force $F_w$ may be expressed at the center or midpoint of the wiper blade 614. The center of the wiper blade 614 may be located at a distance $D_s$ from the pivotal connection 630 of the wiper arm 616 and the biasing force $F_s$ applied by the biasing member 654 to the wiper arm 616 may be located at a distance $D_s$ from the pivotal connection 630. Based on this configuration of the wiper device 600, the force $F_w$ against the sensor housing or the wiper blade 614 may be represented by the following equation:

$$F_w = (F_s * D_s / D_w) \quad (1)$$

where $F_w$ is the contact force exerted on the wiper blade 614 to counter the force 660 exerted by the wiper arm 616, where $D_w$ is the distance from the center of the wiper blade 614 to the pivotal connection 630 of the wiper arm 616, where $D_s$ is the distance from the center of the biasing member 654 to the pivotal connection 630, and $F_s$ is the force applied to the rear region of the wiper arm 616.

The expression above (e.g., equation 1) may be used to design the configuration of the wiper device 600 so that when a sensor housing, such as the sensor housing 506 of the sensor system 504, is rotated or spinning, the wiper device may deploy the wiper blade 614 from a stowed position (e.g., a distance from the sensor housing) to engage with or contact the surface of the sensor housing. The wiper device 600 may also be configured to apply, when the sensor housing 506 is rotating or spinning, additional pressure or force to the wiper blade 614 so that the wiper blade 614 maintains proper contact with the sensor housing 506 for cleaning the surface of the sensor housing. Thus, the wiper device 600 may clean the sensor housing when the sensor housing 506 is rotating.

Figure 7A:
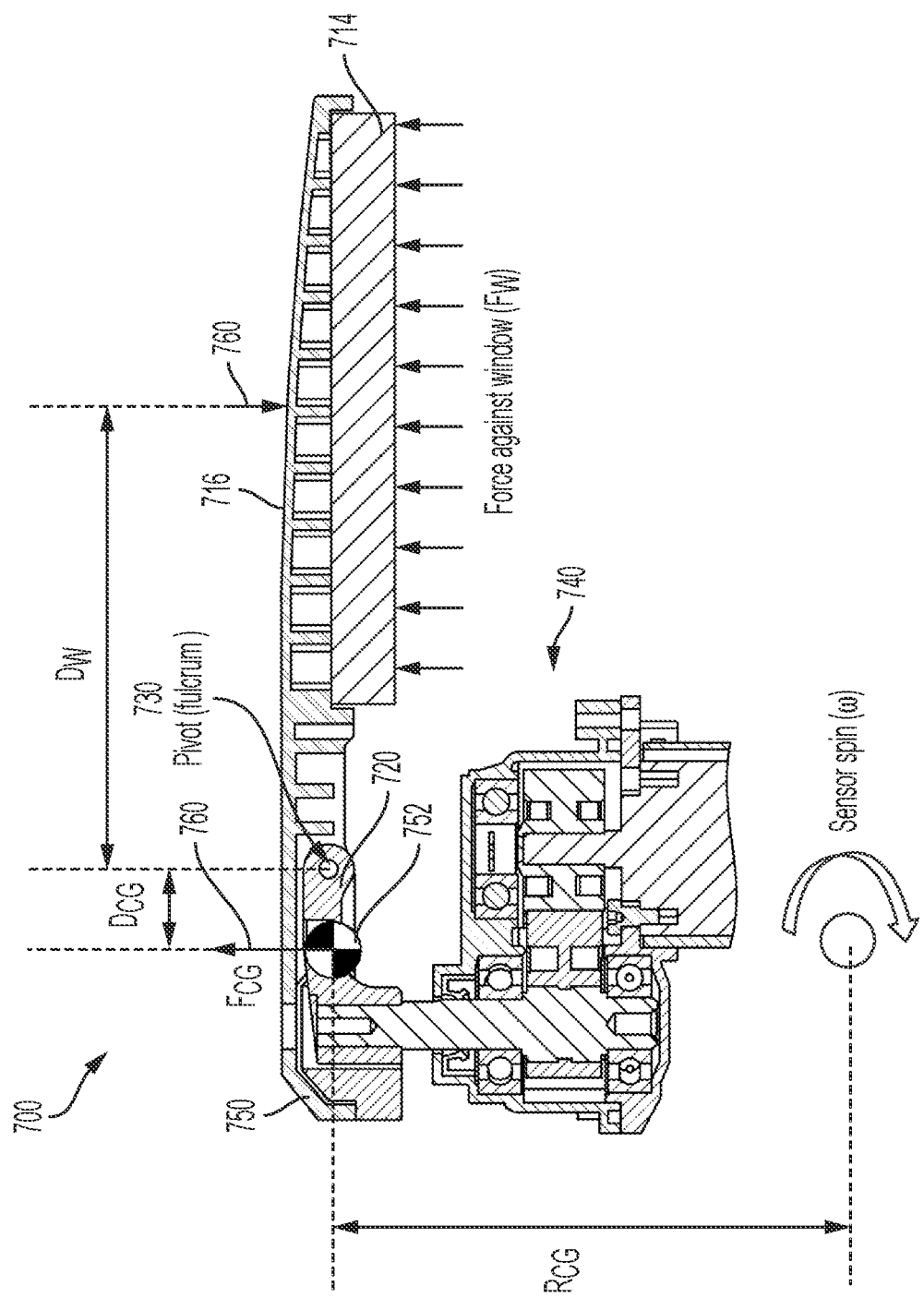
FIG. 7A shows a partial cross-sectional view of another wiper device, according to an example embodiment.

Referring to FIG. 7A, a wiper device or system 700 for wiping a surface of a sensor housing is shown, according to an exemplary embodiment. The wiper system 700 may include a wiper blade 714, a wiper arm 716, a driving arm 720, and a drive assembly 740. The wiper device 700 may correspond in many aspects to the wiper device 500 of FIGS. 5A-5H. The wiper blade 714 may be attached to the front region of the wiper arm 716 and the driving arm 720 may be pivotally or hingedly connected to the wiper arm 716. The wiper arm 716 may include a weight or counterbalance 750 coupled at or near the rear region of the wiper arm 716. For example, the wiper arm 716 may be configured with the weight or counterbalance 750 on one side of the pivotal connection 730 of the wiper arm 716 and the wiper blade 714 on the opposite side of the pivotal connection 730.

The wiper arm 716 may be configured to have a center of gravity 752 at a distance $D_{cg}$ from the pivotal connection 730. For example, the wiper arm 716 may have a center of gravity 752 that is offset by a predetermined distance $D_{cg}$ from the pivotal connection 730. The distance $D_{cg}$ of the center of gravity 752 from the pivotal connection 730 may be determined based on the amount of weight on the rear region of the wiper arm 716. For example, the counterbalance 750 may have a predetermined weight so that the wiper arm 716 has a center of gravity 752 at a distance $D_{cg}$ from the pivotal connection 730. As such, the load or forces applied to or created by the wiper arm 716 are approximately equal on either side of the center of gravity 752 of the wiper arm 716. In other embodiments, the wiper arm 714 may be balanced about the pivotal connection 730 so that the wiper blade 716 has a center of gravity 752 at the pivotal connection 730. As such, when the sensor housing 506 is not rotating, the forces applied to the wiper arm 716 may be approximately equal on opposite sides of the pivotal connection 730.

In some embodiments, the wiper arm 716 of the wiper device 700 may be oriented in a stowed position so that the wiper blade 714 is not in contact with an associated sensor housing (e.g., sensor housing 506). For example, when the sensor housing is stationary, the wiper arm 716 may be positioned adjacent to the sensor housing such that the wiper blade 714 is spaced at a distance from the sensor housing and is not in contact with the sensor housing. As the sensor housing rotates or spins, a force $F_{cg}$ may be provided or created to the weighted end of the wiper arm 716 in a direction of the arrow 760 to cause a force to be applied to the front region of the wiper arm 716 as indicated by the arrow 760. The force applied to the front region of the wiper arm 716 may cause the wiper blade 714 to move toward the surface of the sensor housing and to engage and maintain contact with the sensor housing. For example, the wiping arm 716 may apply a force to cause the wiper blade 714 to be pressed against or contact the surface of the sensor housing while the sensor housing is rotating or spinning. In this arrangement, the wiper blade 714 may be configured to apply a sufficient amount of pressure to the surface of sensor housing while the wiper blade 714 reciprocates to clear moisture and debris from the sensor housing. For example, the wiping arm 714 of the wiper device 700 may be configured to cause the wiper blade 714 to be pressed against or engage the surface of the sensor housing 506 while the sensor housing 506 is rotating or spinning. When the wiper blade is pressed against or contacts the surface of the sensor housing during rotation, a force $F_w$ may be applied against the surface of the sensor housing 506.

When the wiper blade 714 is pressed against the sensor housing 506, the force $F_w$ is applied or distributed substantially evenly along the length of the wiper blade 714 against the surface of the sensor housing 506. The force $F_w$ may be expressed at the center or midpoint of the wiper blade 714. The center of the wiper blade 714 may be a distance $D_w$ from the pivotal connection 730 of the wiper arm 716 and the force $F_{cg}$ applied at the center of gravity 752 may be a distance $D_{cg}$ from the pivotal connection 730. Based on this configuration of the wiper device 700, the force $F_w$ against the sensor housing or the wiper blade 614 may be expressed using the following equations:

$$F_{cg}=M_w*R_{cg}^2*\omega/2 \qquad (2)$$

$$F_w=D_w=F_{cg}*Dcg \qquad (3)$$

$$F_w=(M_w*R_{cg}^2*\omega)/2)D_{cg}/D_w \qquad (4)$$

where $M_w$ represents the weight or mass of the wiper arm, where $R_{cg}$ represents distance from the center of gravity of the wiper arm to the center of rotation of the sensor housing of the sensor system, where $F_w$ represents the contact force exerted on the wiper blade 714 to counter the force 760 exerted by the wiper arm 716, where $D_w$ represents the distance from the center or midpoint of the wiper blade 714 to the pivotal connection 730, wherein $D_{cg}$ represents the distance from the center of gravity 752 of the wiper arm 716 to the pivotal connection 730, and $F_{cg}$ represents the force applied through the center of gravity of the wiper arm and the center of rotation of the sensor housing of the sensor system In one embodiment, the mass $M_w$ of the wiper arm 716 may be 20 grams, the distance $D_w$ between the center of the wiper blade 714 and the pivotal connection 730 may be 80 mm, the weight or mass of the counterweight may be 60 grams, the distance $D_{cg}$ between the center of the gravity 752 and the pivotal connection 730 may be 40 mm, and the centripetal acceleration ω of the sensor housing or sensor spin may be 30 Gs. Based on equations 2-4 above, the preload force $F_w$ on the wiper arm 716 from the counterweight or counterbalance may be computed as follows: $F_w$=60 grams*40 mm/80 mm*30 Gs*(9.8 m/s)²/G=8.8N. The centripetal force on the wiper arm 716 may be computed as follows: 20 grams*30 Gs*(9.8 m/s)²/G=−5.9N. Thus, the net preload force of the wiper blade 714 on the sensor housing may be computed as follows 8.8N−5.9N=2.9N. In this example, only the counterweight applies a preload force (e.g., no other source applies a preload force). However, in some embodiments, this solution may be combined with a spring preload system as described above. In other embodiments, the counterweight or counterbalance may cancel out the centripetal acceleration of or provide additional preload. For instance, in the example described above, a spring may provide 1N of preload force (whether the sensor housing is rotating or stationary) and the counterbalance may be reduced from 60 grams to 53 grams. This would reduce the preload of the wiper arm 716 from the centripetal forces to 1.9N so that the sum of the spring and the centripetal preloads may be 2.9. It will be recognized that a wiper device may have many different configurations.

Figure 7B:
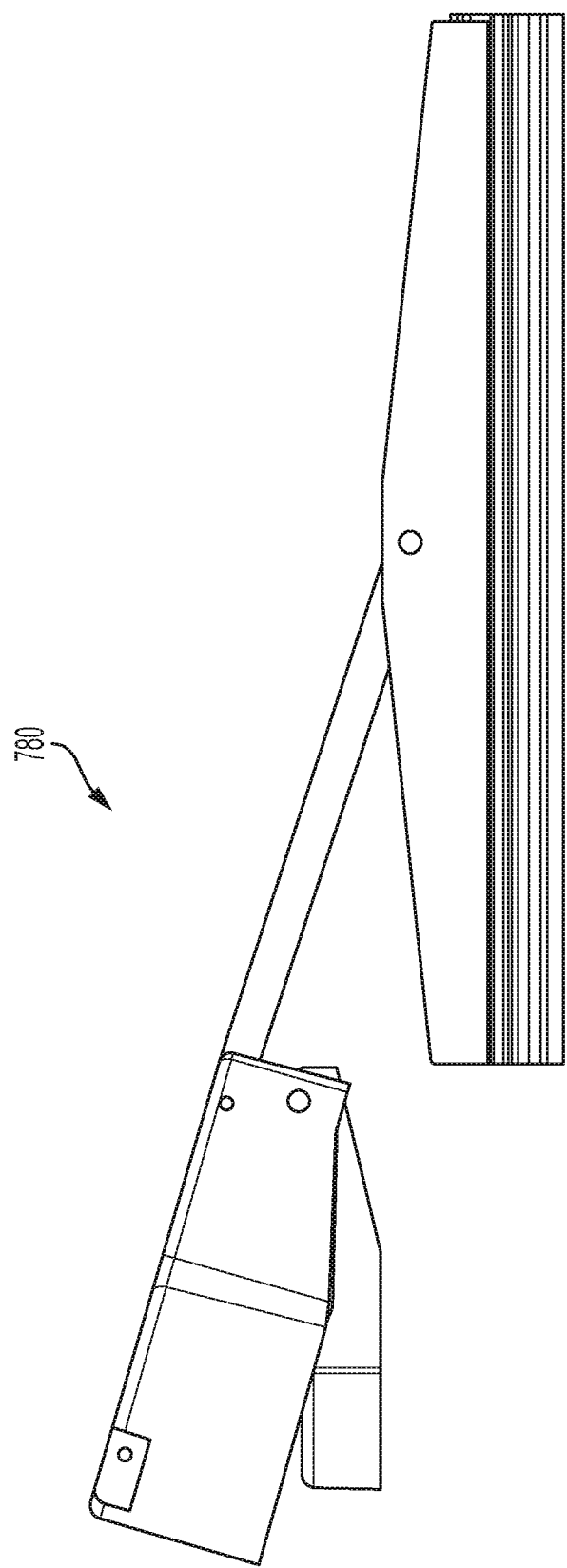
FIG. 7B shows a side view of another wiper device, according to an example embodiment.
Figure 7C:
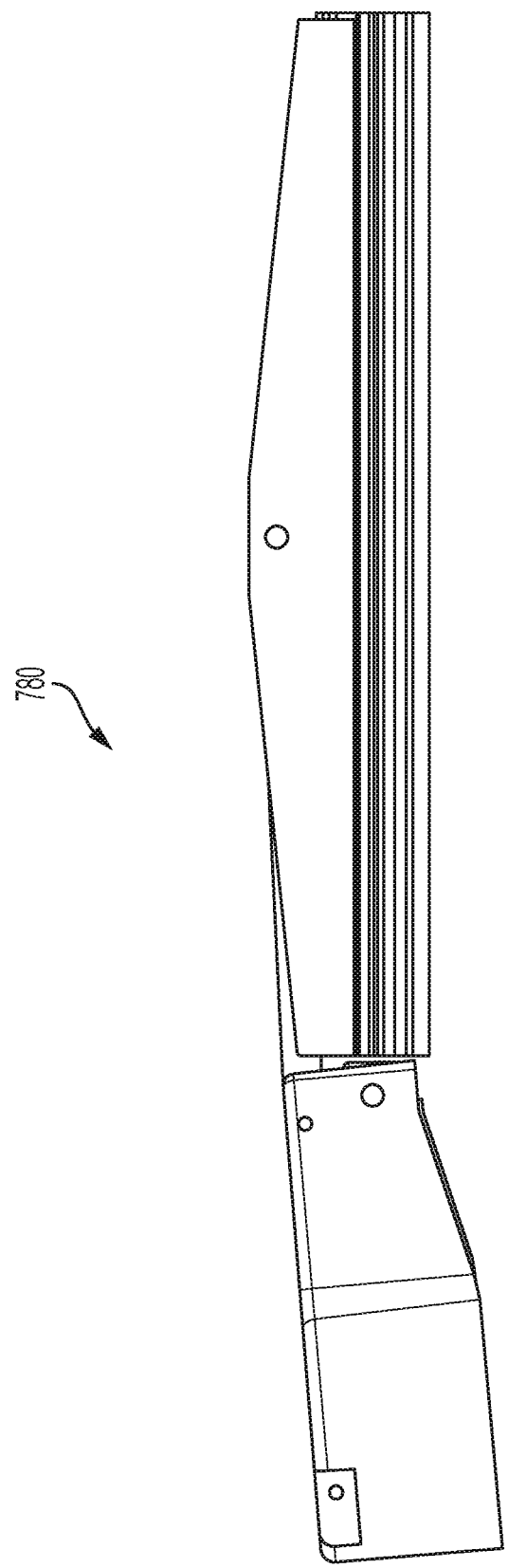
FIG. 7C shows a side view of a wiper device of FIG. 7B.

Referring to FIGS. 7*a* and 7*b*, a wiper device or system 780 for wiping a surface of a sensor housing is shown, according to another exemplary embodiment. The wiper device 780 may correspond in many aspects to the wiper device 500 of FIGS. 5A-5H, except that the wiper blade may be connected to the wiper arm at point joint to allow the wiper blade to rotate or pivot to conform to the surface of a sensor housing, such as the sensor housing 506 of the sensor system 504 of FIGS. 5A-5B. FIG. 7*a* shows the wiper device 780 in an extended or actuated position and FIG. 7*b* shows the wiper device in a stowed position.

The features of the wiper devices described herein allow for a wiper blade of the wiper device to be pressed against a surface of a rotating sensor housing to clear moisture and debris. The wiper arm of a wiper device may be configured to react to and/or counteract the forces on the wiper device as the sensor housing rotates. As a result, the wiper arm can maintain proper pressure of the wiper blade against the surface of the sensor housing. Further, the sensor system may continue operation without interruption or the need for an individual to manually clean the sensor housing. As such, the wiper blade of the wiper device may continually and rapidly clean the sensor housing when needed. Thus, the wiper device may enable a rotatable sensor system to operate in various environments including environments that produce debris, such as construction sites or off-road locations for road vehicles such as cars, trucks, etc. However, while certain aspects of the disclosure may be particularly useful in connection with specific types of vehicles, the vehicle may be any type of vehicle.

Further, a fluid dispensing or spraying system may also be used with the wiper devices as described herein. The fluid dispensing system may operate in tandem with a wiper device to assist in clearing moisture and debris from a surface of a sensor housing. For example, a cleaning and/or lubricating fluid can be automatically dispensed or sprayed by the fluid dispensing system onto an outer surface of a sensor housing (e.g., sensor housing 506) to assist with the removal process. In one embodiment, the fluid dispensing system may include one or more spray nozzles. The spray nozzles may be positioned around sensor housing to spray wiper fluid, such as cleaning and/or lubricating fluid, onto surface of the sensor housing. In this regard, the fluid dispensing system can automatically dispense wiper fluids through the spray nozzles as the sensor housing spins. For example, as the sensor housing is rotating, the fluid dispensing system may emit fluid each time the wiper blade passes the spray nozzle.

Figure 8:
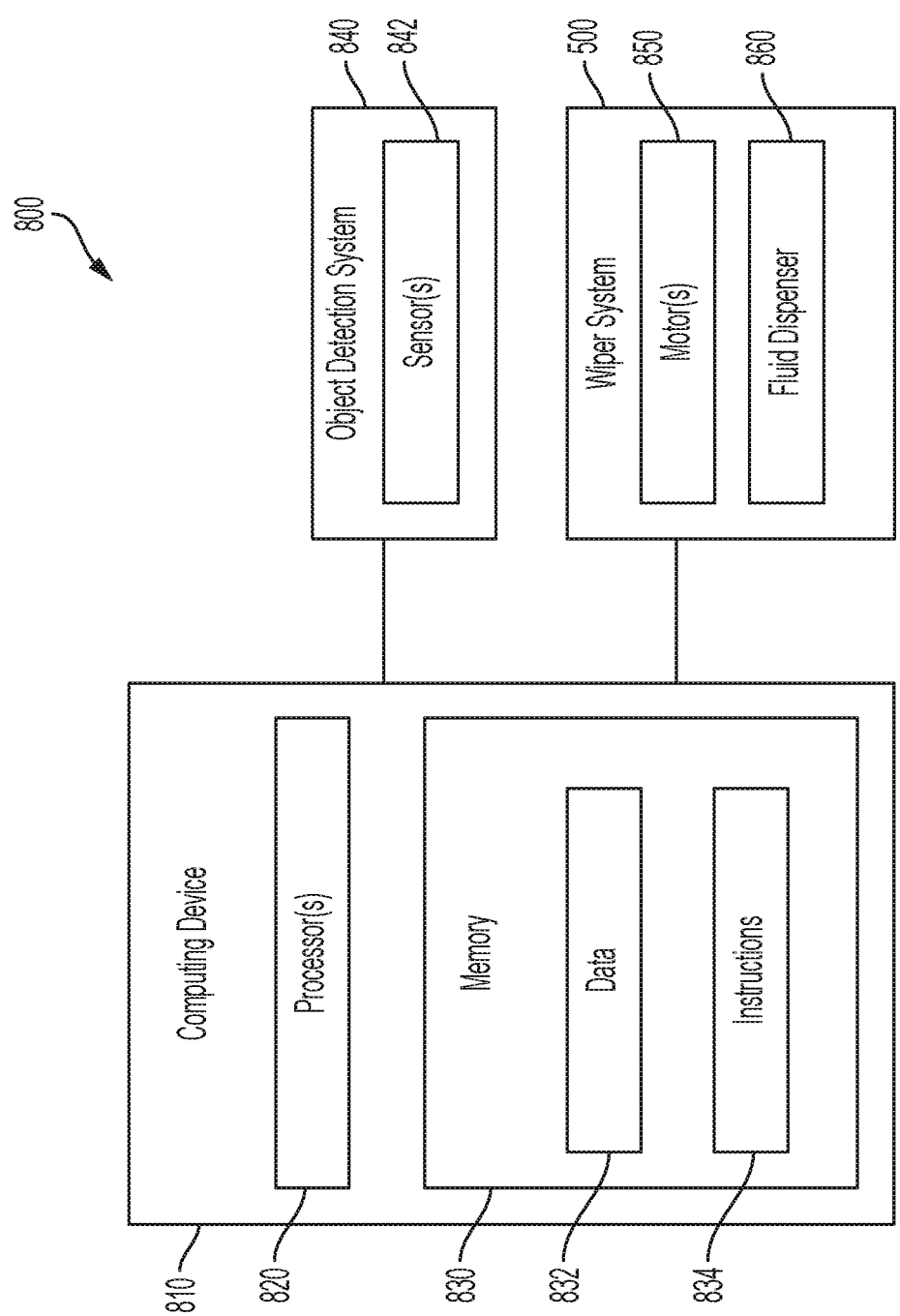
FIG. 8 is a simplified block diagram of a control system, according to am exemplary embodiment.

A control system may communicate with the wiper devices described herein. The control system may control the actuation or deployment of a wiper device, may detect or track the position or location of the wiper device on the sensor housing, may detect the speed of the sensor housing or wiper device, and may cause cleaning fluid to be dispensed at particular times. In some examples, the control system may provide an alert indicating that a sensor housing of a sensor system requires cleaning and/or may initiate an automatic process that helps remove the material on the sensor housing FIG. 8 illustrates an example of a computing device or control system 800 for a wiper device in which the features described above may be implemented. As shown, the control system 800 in accordance with one aspect of the disclosure may have one or more computing devices, such a computing device 810 containing one or more processors 820, memory 830 and other components typically present in a computing device. For example, the computing device 810 may be incorporated into a sensor or vehicle system. The computing device 810 may be capable of communicating with various components of the vehicle. For example, the computing device 810 may be in communication with various systems of a vehicle, such as a vehicle control system. Further, the computing device 810 may control one or more motor(s) 850 of a wiper device (e.g., the wiper device) which may include a motor that reciprocates a wiper blade of a wiper device and a motor that rotates or spins a sensor housing of a sensor system.

The memory 830 stores information accessible by the one or more processors 820, including data 832 and instructions 834 that may be executed or otherwise used by the processor 820. The memory 830 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 834 may be any set of instructions to be executed directly (such as machine code) or indirectly (such as scripts) by the processor 800. For example, the instructions may be stored as computing code on a computing device-readable medium. In that regard, the terms "instructions" and "programs" may be used interchangeably herein. The instructions may be stored in object code format for direct processing by the processor 800, or in any other computing device language including scripts or collections of independent source code modules that are interpreted on demand or compiled in advance. Functions, methods and routines of the instructions are explained in more detail below.

The data 832 may be retrieved, stored or modified by the processor 820 in accordance with the instructions 834. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 820 may be any conventional processors, such as commercially available CPUs. Alternatively, the one or more processors may be a dedicated device such as an ASIC or other hardware-based processor. Although FIG. 8 functionally illustrates the processor, memory, and other elements of the computing device 810 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the computing device 810. Accordingly, references to a processor or computing device will be understood to include references to a collection of processors or computing devices or memories that may or may not operate in parallel.

In some embodiments, the computing device 810 may receive signals from other systems in a vehicle indicating that the wiper blade of the wiper device 500 should be activated. The computing device 810 may activate a drive motor that reciprocates the wiper blade of the wiper system 500 over the sensor housing. For example, the computing device 810 can deploy the wiper blade of the wiper system 500 when debris or deterrents are present on the sensor housing of the sensor system. For example, when rain, debris or the like accumulate on a surface of the sensor housing and may occlude the sensors positioned within the sensor housing, the computing device 810 may receive a message or signal that the sensor housing may be occluded. The message may be transmitted from another system within a vehicle that detects the presence of optical deterrents on the sensor housing, such as an object detection system 840.

The object detection system 840 can include its own memory, data, instructions, and processors. In one example, object detection system 840 may include one or more sensor(s) 842 for detecting an amount of debris encountered by the sensor housing. For example, the sensor(s) 842 may include one or more of the sensor(s) 842 inside the sensor housing, or other sensors located elsewhere on the vehicle. For example, the sensor(s) 842 may be cameras, such as the same cameras that are used to gather information to maneuver the vehicle assembly. The processors of the object detection system 840 may conduct complex post processing using digital filters and logic on the received images to evaluate the quality of the received image and determine if occlusions are present on the sensor housing and if so, an amount of debris present on the sensor housing. Alternatively or additionally to such cameras, the sensor(s) 842 may include other types of sensors, such as ones that can detect a weight or pressure on the sensor housing. Conversely, when the control device 810 receives a message from the object detection system 840 that the debris or moisture is sufficiently cleared from the surface of the sensor housing or no longer present on the sensor housing, control device 810 can deactivate the drive motor actuating the wiper system 500.

When the wiper system 500 is activated, computing device 810 may further control the motor(s) 850 of the wiper system 500. For another example, the processors 820 of the computing device 810 may change the speed of the motor(s) 850 based on the amount of debris encountered and/or the number of consecutive sensor signals transmitted by the sensor(s) 842. In some embodiments, the position of the wiper blade may be determined by the control system. For example, once the wiper blade is deployed, one or more position sensors within the control system can be used to determine the presence and position of the wiper blade.

The computing device 810 may also receive signals indicating the positions of the wiper blade of the wiper system 500 and provide signals to other systems. For example, computing device 810 may control the fluid dispensing system 860 to dispense fluid through spray nozzles positioned around the sensor housing 110 or inside the wiper blade of the wiper device 500. The control system 310 may send a signal to fluid dispensing system 860 to pump fluid into fluid lines such that one or more nozzles will spray wiper fluid when the wiper blade is at the optimum position. For example, at the time the wiper blade is at the optimum position, the fluid dispensing system 860 will dispense fluid through the respective spray nozzles. Thus, the one or more spray nozzles can be triggered by the control system as the sensor housing rotates.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid-state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A wiper device comprising:
   a driving arm having a first end and a second end, the first end of the driving arm connected to a rotatable shaft;

a wiper arm pivotally connected to the second end of the driving arm at a pivotal connection, wherein the pivotal connection is located between a front region and a rear region of the wiper arm;

a wiper blade coupled to the front region of the wiper arm, the wiper blade configured to wipe the surface of a rotatable sensor housing; and a counterweight coupled to the rear region of the wiper arm, such that the counterweight defines a location of a center of gravity of the wiper arm relative to the pivotal connection.

2. The wiper device of claim 1, wherein the pivotal connection is configured to enable a rotational or a pivoting movement of the wiper arm about an axis.

3. The wiper device of claim 1, wherein the pivotal connection is configured to enable the wiper arm to pivot between one or more positions.

4. The wiper device of claim 3, wherein the wiper arm is configured to move from a first position to a second position when the rotatable sensor housing is rotated.

5. The wiper device of claim 4, wherein the first position comprises a stowed position of the wiper device and the second position comprises a deployed position of the wiper device.

6. The wiper device of claim 5, wherein the wiper blade is spaced from the surface of the rotatable sensor housing in the stowed position, and wherein the wiper blade contacts the surface of the rotatable sensor housing in the deployed position.

7. The wiper device of claim 1, wherein the rotatable sensor housing is configured to rotate about an axis.

8. The wiper device of claim 1, further comprising a drive member configured to rotate the rotatable shaft about an axis.

9. The wiper device of claim 1, wherein the rotatable shaft extends through a sidewall of the rotatable sensor housing, and wherein the rotatable shaft is configured for rotation.

10. The wiper device of claim 1, wherein the wiper device is mounted to the rotatable sensor housing.

11. The wiper device of claim 1, further comprising a biasing member having an end configured to engage with the driving arm and an opposite end configured to engage with the wiper arm.

12. The wiper device of claim 11, wherein the biasing member is configured to provide a force on the wiper arm to cause the wiper blade to press against the surface of the rotatable sensor housing.

13. The wiper device of claim 11 wherein the biasing member includes a spring member.

14. The wiper device of claim 11, wherein the biasing member is disposed within a recess formed in the driving arm.

15. The wiper device of claim 1, wherein the wiper blade is configured to engage with the rotatable sensor housing upon rotation of the rotatable sensor housing.

16. The wiper device of claim 1, wherein the location of the center of gravity of the wiper arm is at the pivotal connection.

17. The wiper device of claim 1, wherein the location of the center of gravity of the wiper arm is offset at a distance from the pivotal connection.

18. The wiper device of claim 1, further comprising a fluid duct or nozzle configured to dispose fluid on the rotatable sensor housing when the rotatable sensor housing is at a predetermined position during rotation of the rotatable sensor housing.

19. The wiper device of claim 1, further comprising a vehicle, wherein the rotatable sensor housing is coupled to the vehicle.

20. A device comprising:
a driving arm having a first end and a second end, the first end of the driving arm connected to a rotatable shaft;
a wiper arm pivotally connected to the second end of the driving arm at a pivotal connection, wherein the pivotal connection is located between a front region and a rear region of the wiper arm;
a counterweight coupled to the rear region of the wiper arm, such that the counterweight defines a location of a center of gravity of the wiper arm relative to the pivotal connection;
a biasing member configured to apply a force to the rear region of the wiper arm; and
a wiper blade coupled to the front region of the wiper arm, the wiper blade configured to reciprocate between a first position and a second position to wipe a surface of a rotatable sensor housing.

* * * * *